United States Patent [19]

Kalman

[11] Patent Number: 5,632,902
[45] Date of Patent: May 27, 1997

[54] FILTERING METHOD AND APPARATUS INCLUDING VALVES WITH VALVE PLUGS OF A COOLED FLUID SUBSTANCE

[76] Inventor: Peter G. Kalman, 69 Hillway, Holly Lodge Estate, Highgate, London N6 6AB, England

[21] Appl. No.: 791,831

[22] Filed: Nov. 13, 1991

[30] Foreign Application Priority Data

Nov. 16, 1990 [GB] United Kingdom ............... 902493804

[51] Int. Cl.[6] ..................................... B01D 35/12
[52] U.S. Cl. ............... 210/741; 210/742; 210/90; 210/387
[58] Field of Search ................... 210/767, 321.64, 210/87, 89, 90, 103, 295, 184, 387, 741, 742

[56] References Cited

U.S. PATENT DOCUMENTS

| | | | |
|---|---|---|---|
| 2,002,383 | 5/1935 | Witt . | |
| 3,052,253 | 9/1962 | Priaroggia et al. . | |
| 3,471,017 | 10/1969 | Kalman | 210/489 |
| 3,631,870 | 1/1972 | Livingston . | |
| 3,672,507 | 6/1972 | Paull, Jr. | 210/387 |
| 3,828,974 | 8/1974 | Tenner . | |
| 3,856,674 | 12/1974 | Kalman | 210/489 |
| 3,856,680 | 12/1974 | Elmore . | |
| 3,940,335 | 2/1976 | Kalman | 210/179 |
| 4,010,391 | 3/1977 | Kalman | 210/184 |
| 4,083,478 | 4/1978 | McLane . | |
| 4,202,659 | 5/1980 | Kinoshita . | |
| 4,426,284 | 1/1984 | Mitchell et al. | 210/90 |
| 4,511,472 | 4/1985 | Trott . | |
| 4,654,151 | 3/1987 | Kalman . | |
| 4,817,377 | 4/1989 | Diggott | 210/767 |
| 4,842,750 | 6/1989 | Britchi | 210/387 |
| 4,849,113 | 7/1989 | Hills . | |
| 4,888,110 | 12/1989 | Fogarty, Jr. | 210/184 |
| 5,125,427 | 6/1992 | Cantu et al. . | |
| 5,246,660 | 9/1993 | Tsutsumi . | |

FOREIGN PATENT DOCUMENTS

| | | |
|---|---|---|
| 0250695A1 | 6/1986 | European Pat. Off. . |
| 0275462A2 | 12/1987 | European Pat. Off. . |
| 1527722 | 4/1968 | France . |
| 2332113 | 6/1977 | France . |
| 1238198 | 4/1967 | Germany . |
| 1269595 | 6/1968 | Germany . |
| 1779497 | 9/1971 | Germany . |

(List continued on next page.)

OTHER PUBLICATIONS

Plastics Technology, Oct., 1977, pp. 65–72.
Brochure of Kreyenborg & Co. (distributed prior to 1988), pp. 12).

*Primary Examiner*—Frank Spear
*Attorney, Agent, or Firm*—Pennie & Edmonds

[57] ABSTRACT

Filtering apparatus including two or more passages acting in parallel, each having an extended filter which passes through inlet and outlet ports preferably sealed by substantially solidified plugs of the flowable substance such as polymer being filtered. The flow of such substance through an initially open passage can be terminated so as to permit filter advance under conditions of zero pressure drop whilst flow through the other passage or passages continues. In an additional or alternative mode, flow from a common inlet into a passage is terminated and a secondary outlet conduit in that passage is opened. This creates a counterflow caused by the pressure of substance from the other passage or passages which cleans the filter. Either or any passage or conduit is sealed or valved by a substantially solidified valve plug made of the flowable substance being filtered, said plug being extrudable subsequently when the passage or conduit requires opening to flow. A valve suitable for use in a secondary outlet has a side passage in which a valve plug is formed of a flowable substance in a sufficiently solidified state, having also means for forcing the valve plug into the flow so that the flow of substance can be stopped. A diverter valve may be constructed from two or more such flow valves.

88 Claims, 15 Drawing Sheets

FOREIGN PATENT DOCUMENTS

| | | |
|---|---|---|
| 2403765 | 1/1974 | Germany . |
| 2947673A1 | 6/1981 | Germany . |
| 3125162 | 1/1983 | Germany . |
| 3125162A1 | 1/1983 | Germany . |
| 55-132230 | 10/1980 | Japan . |
| 760316 | 10/1956 | United Kingdom . |
| 1181075 | 2/1970 | United Kingdom . |
| 7433807 | 4/1976 | United Kingdom . |
| 1587580 | 4/1981 | United Kingdom . |
| 2102691 | 2/1983 | United Kingdom . |

FILTERING METHOD AND APPARATUS INCLUDING VALVES WITH VALVE PLUGS OF A COOLED FLUID SUBSTANCE

BACKGROUND OF THE INVENTION

This specification relates primarily to filtering flowable substances including polymers and to valves for use therein. Nevertheless, aspects of the features disclosed will be of use in other contexts.

Filtering of fluid thermoplastic polymers such as at least partially molten polyethylene, polypropylene and polystyrene, is an important process in polymer converting and scrap reprocessing where contaminants such as for example concrete dust or metal swarf have to be often removed. However, filters used in such applications can become rapidly clogged with the contaminants. It is extremely desirable that processing be continuous but the need to deal with contaminated filters poses problems.

In GB-A-1181075 there is disclosed an extended filter which can be advanced through inlet and outlet ports to introduce fresh filter parts into a filtering passage as required. In this arrangement, the ports are sealed by solid or semi-solid plugs. However, in cases of highly contaminated polymer this can become an expensive process as the filter will need to be advanced at very frequent intervals. Allowing the filter to become excessively clogged will not only reduce filtering efficiency but will also make advancing of the filter a difficult matter as there will be high frictional drag between the filter and a backing support plate that is typically used. If inexpensive filters are used, in an attempt to compensate for the costs of high filter consumption, these may break under the force applied to advance them.

In GB-A-1433867, there is disclosed a modified arrangement with two filters in a single passage which obviates the need for a stationary support. This deals with the frictional problems but filter consumption will still be high, and/or filtering efficiency reduced, in cases of highly contaminated polymer.

There has been proposed a system utilizing two filtering passages and two fixed filters. An example is the "Kleen Screen" (Trade Mark) system of Welding Engineers Inc. When one filter becomes clogged, the supply of polymer to its passage inlet is terminated. A valve which communicates with the passage between the inlet and the filter is opened, and the pressure of polymer which is still being filtered through the other passage causes a counterflow through the filter and out via the valve. The valve is then closed and flow to the passage is started again. When desired the same series of operations is carried out in the other passage, so that the filters are alternately cleaned by a counterflow. In cases of heavy contamination, however, the filters will rapidly become too clogged for counterflow cleaning to be sufficiently effective. This requires frequent laborious and time consuming manual replacement of an entire filter.

SUMMARY OF THE INVENTION

It has now been found that a number of new and inventive features can facilitate considerably the filtering of molten polymers, and particularly highly contaminated polymers. Thus, it has now been found that significant advantages can be obtained by operating two or more extended filter devices in parallel, in such a way that the outlets of the devices are in communication, so as to provide advantageous modes of operating the apparatus.

Thus, according to an invention disclosed herein, there is provided apparatus for filtering flowable substances or materials comprising first and second filtering passages each of which has;

(a) an inlet for material to be filtered and an outlet for filtered material;
(b) an inlet port and an outlet port for a filter to be passed into and out of the passage, at a location situated between the material inlet and material outlet;
(c) sealing means for the inlet and outlet ports; and
(d) means for introducing a fresh filter part into the passage through the inlet port and for removing a used filter part through the outlet port;

wherein means are provided for communicating the outlets of the first and second passages with each other and the apparatus further comprises flow control means for permitting flow of the flowable substance from a source thereof into the inlet of the first filtering passage, through a filter part situated therein and from the outlet thereof, whilst restricting such flow into and through the second passage and for alternatively permitting flow of the substance from a source thereof into the inlet of the second filtering passage, through a filter part situated therein and from the outlet thereof, whilst restricting such flow into and through the first passage.

In general, the outlets of the passage will be permanently in communication, and will feed a common destination, but it would be possible to have controlled communication through a flow control valve.

With the outlets of the passages in communication, supply of material from the apparatus does not need to be terminated but the conditions in either passage can be changed by terminating flow through its input so as to facilitate filter movement, by establishing conditions of low to zero pressure drop across the filter, whilst the other passage continues filtering. Whilst there will be a continuous supply of filtered material, the rate of supply may drop whilst the filter is being moved in one passage. In some cases, the passages may work in parallel for a period. In others, there may be continual switching between the passages so that only one is active for filtering at any time.

The supply of plastic could be a single extruder or the like using suitable flow diverter valves, or two or more extruders each feeding one filtering passage. In the former case, outputs from the extruder can be continuous. In the latter case, one extruder would have to be stopped from operating when the supply to its passage is to be terminated, or its output, possibly reduced, would have to be diverted temporarily to another passage. In general it is preferred to have not only continuous supply of flowable substance to a destination such as a granulator, but also continuous operation of the source of supply such as an extruder. In any event the aim is to keep production continuous at all times and to have filtering through at least one passage.

The apparatus can be operated automatically and can advantageously comprise means for determining the pressure drop across a filter part during filtering, means for operating the flow control means when the pressure drop in a passage exceeds a predetermined level, so as to restrict flow of material into and through that passage, and means to introduce a fresh portion of filter into the passage and to remove a used portion of filter from the passage, whilst the flow of material is so restricted. The pressure drop could be measured by means of two pressure transducers, one upstream and one downstream of the filter part. In the most preferred embodiments, where the outlets are permanently joined, a single transducer can measure the pressure of material flowing to the destination. In these preferred embodiments, there is also a common source, rather than e.g. two independent extruders, and a single transducer can be used to measure inlet pressure. The arrangement is such that both passages do not terminate filtering at the same time. The system detects an increased pressure drop and chooses alternate passages to be shut off from the filtering process. If independent monitoring was used, for example if separate extruders fed two inlets, then the system would also have to be controlled to ensure that both passages were not shut off from filtering at the same time.

The apparatus can be operated in such a way that a new portion of filter introduced into a passage covers only a part of the filtering aperture of the passage, so that the portion of filter removed is not the entire contaminated filter part in the passage. However, a significant advantage of the new apparatus is that under appropriate circumstances the filter part in the passage can be replaced entirely in one operation rather than in small increments before the rapid increase in clogging could overwhelm the filtering process. Thus, preferably the means for introducing a fresh portion of filter is arranged to replace substantially the entire contaminated filter part in the passage.

The filter could be an elongate ribbon of woven steel, or a series of discrete elements, or be of any other suitable form. The inlet and outlet ports could be sealed at least in part by mechanical means but preferably the sealing is achieved in the manner disclosed in e.g. GB-A-1181075, by means of plugs of largely solidified polymer which are controlled thermally. The preferred manner of operating the apparatus of the present invention involves movement of a substantial area of contaminated filter at one time, rather than the gradual, continuous or intermittent advance of a filter in the preferred embodiments of the prior art system.

The mechanical construction of the filter passages themselves in the apparatus described above can be similar to that of the apparatus described in the prior art such as GB-A-1181075. A backing support should be provided for the filter. Typically the support may be a perforated plate of steel or another suitable material. The inlet and outlet ports may also be of the general type shown in GB-A-1181075, with heating and/or cooling passages to control the formation of plugs of the material being filtered or, in some circumstances, another material. Advancing of a filter through the ports may be achieved by controlled extrusion of the sealing plug in which the filter is embedded or by mechanical traction on that plug or on the filter itself, or by a combination of these.

Controlled extrusion of a sealing plug together with the filter embedded therein can be effected by making the cross sectional area of the outlet port greater than that of the inlet port. The pressure of material in the passage will produce a net force in the direction of filter advance.

Since controlled extrusion of a sealing plug facilitates filter advancement, whilst frictional forces on the filter hinder it, there are advantages in a system which permits such extrusion to take place without frictional forces. It is therefore advantageous to provide conditions of low or zero pressure drop across a filter part in the passage, whilst the pressure of material in the passage can assist or bring about filter movement. In the apparatus of the present invention this can be achieved, since when the flow into the inlet of a passage is restricted so as to produce conditions of low or zero pressure drop, the passage is still subjected to the pressure of material from the outlet of the other passage.

Thus, there is provided apparatus for filtering fluid polymeric material comprising first and second filtering passages each of which has;

(a) an inlet for material to be filtered and an outlet for filtered material;

(b) an inlet port and an outlet port for a filter to be passed into and out of the passage, situated between the material inlet and material outlet, the outlet port being of larger cross-sectional area than the inlet port;

(c) means for selectively introducing a fresh filter part into the passage through the inlet port and for removing a used filter part through the outlet port; and (d) cooling means for forming seals in the inlet and outlet ports in the form of plugs of the material being filtered or of another material, the outlet plug being moveable when desired in the direction of filter advance at least partly under the influence of the pressure of material in the passage;

the apparatus further comprising flow control means for selectively permitting flow of fluid polymeric material from a source thereof into the inlet of the first filtering passage, through a filter part therein and from the outlet thereof, whilst restricting such flow into and through the second passage, and for selectively permitting flow of fluid polymeric material from a source thereof into the inlet of the second filtering passage, through a filter part therein and from the outlet thereof, whilst restricting such flow into and through the first passage, the outlets for filtered material of the two passages being communicable, whereby when flow into the inlet of a filtering passage is restricted, the passage may be subjected to the pressure of material from the outlet of the other passage so as to effect or assist in movement of a filter part by extrusion of a sealing plug in the outlet port.

Thus, when flow of material to be filtered is terminated through the inlet, there will be no or substantially no pressure drop across the filter part and there will be much reduced frictional forces resisting movement. The back pressure of material at the outlet will create a pressure differential between the interior of the passage and the outside. This can be used for filter advancement.

Additionally or alternatively, apparatus in accordance with the invention may be provided with means for permitting periodic cleaning of a filter part by a counterflow, when the flow from a source into a passage is interrupted. Thus preferably each passage is provided with a secondary outlet disposed between the material inlet and the position of a filter part, means being provided for selectively opening and closing the secondary outlet. The secondary outlet will be spaced from the filter part and distinct from the outlet port through which the filter part will pass.

In use, an operating condition can be brought about in which flow control means prevents flow into the inlet of a filtering passage, the secondary outlet is open and the material outlet for filtered material is in communication with the equivalent material outlet of the other passage. The pressure of the filtered material from the other passage will cause a counterflow through the filter part and through the associated secondary outlet to clean the filter part. This can be carried out at regular intervals and could be effected automatically. Preferably means are provided for determining the pressure drop across a filter part during filtering, means for operating the flow control means when the pressure drop in one of the passages exceeds a predetermined level, so as to prevent flow of material through the inlet into the passage, and means for opening the secondary outlet of the passage so as to permit a counterflow of material through the filter part and the secondary outlet as a result of the pressure of filtered material from the outlet of the other passage. The system for monitoring pressure drop could be as described earlier. Preferably, a backing support is provided on both sides of the filter.

Where both filter movement under conditions of reduced pressure drop, and filter cleaning by means of counterflow are provided, periodic counterflow cleaning will be carried out until contamination reaches such a level that it can no longer be removed effectively by such cleaning, e.g. when the contaminants are so deeply forced into the interstices of a filter that they cannot be removed. At that stage, the contaminated filter part, or at least a portion of it, is removed from the passage and replaced by a fresh part. Thus, when the pressure drop exceeds a set level, counterflow cleaning is effected. The pressure drop after cleaning is measured. If it exceeds a predetermined level, which will be lower than the level set for cleaning but sufficiently close to it to indicate that cleaning has not been effective to the desired extent, then a filter advance operation will be carried out.

In apparatus provided with a movable filter and with a counterflow system as described above, it may in practice be possible to move the filter safely and efficiently even without arranging for there to be no, or low, pressure drop across the filter. Under certain operating conditions, e.g. where contamination is not extreme, continuous or intermittent filter advance, may be adequate providing that there is regular counterflow cleaning.

The secondary outlets may be closed during filter advancement so as to ensure the minimum pressure drop across the filter part and the maximum available pressure for plug extrusion. Alternatively, the secondary outlet may be open to permit some flow, so as to remove collected contaminants and this will then create some reverse pressure differential across the filter. In practice such a mode of operation would only be employed if filter advance was carried out during a counterflow cleaning operation.

In general, advantages of preferred embodiments of the apparatus described above and earlier are that continuous filtering is maintained in the apparatus, so that e.g. extruders do not have to be shut down; and for example, pelletizing may be carried out continuously; and, depending on the apparatus and its mode of operation, a filter can be moved under advantageous conditions of low or zero pressure drop so as to facilitate the use of inexpensive lightly constructed filters. Where appropriate this movement is assisted by the pressure of material in the passage, and a counterflow condition can be arranged to clean a filter part in the passage.

Filtering systems previously available have had various disadvantages when the contamination level was high. Apparatus in accordance with preferred embodiments of this invention has the capability to combine advantageous features of filter advance and counterflow conditions, and can cope with a wide range of contamination levels so as to enable the best combination of efficiency, convenience and cost-effectiveness to be achieved for any particular circumstance.

There are also disclosed herein a number of related filtering processes.

Thus viewed from a further aspect, according to an invention disclosed herein there is provided a process for filtering fluid polymeric material in apparatus comprising first and second filtering passages each of which has;

(a) an inlet for material to be filtered and an outlet for filtered material;

(b) an inlet port and an outlet port for a filter to be passed through the passage, at a location situated between the material inlet and material outlet;

(c) sealing means for the inlet and outlet ports; and (d) means for selectively introducing a fresh filter part into the passage through the inlet port and for removing a used filter part through the outlet port;

the outlets for filtered material of the two passages being communicable.

The process includes the steps of selectively permitting flow of fluid polymeric material from said source thereof into the inlet of the first filtering passage, through a filter part therein and from the outlet thereof, whilst restricting such flow into and through the second passage so as to create a condition of reduced pressure drop across a filter part therein, and introducing a fresh filter part into the second passage and removing a used filter part therefrom whilst flow is so restricted; and selectively permitting flow of fluid polymeric material from a source thereof into the inlet of the second filtering passage, through a filter part therein and from the outlet thereof, whilst restricting such flow into and through the first passage, so as to create a condition of reduced pressure drop across a filter part therein, and introducing a fresh filter part into the first filter passage and removing a used filter part therefrom whilst flow is so restricted.

Viewed from a further aspect, according to an invention disclosed herein there is provided a process for filtering fluid polymeric material using apparatus comprising first and second filtering passages each of which has;

(a) an inlet for material to be filtered and an outlet for filtered material;

(b) an inlet port and an outlet port for a filter to be passed through the passage, at a location situated between the material inlet and material outlet;

(c) sealing means for the inlet and outlet ports;

(d) means for selectively introducing a fresh filter part into the passage through the inlet port and for removing a used filter part through the outlet port; and (e) a secondary outlet for the passage positioned intermediate the material inlet and the position of a filter part in use, the secondary outlet being selectively controllable so as either to prevent or permit a flow of material from the passage;

the process comprising the steps of selectively permitting flow of fluid polymeric material from a source thereof into the inlet of the first filtering passage, whilst preventing such flow into the second passage, permitting a flow of material through the secondary outlet of the second passage, and exposing the second passage to the pressure of material from the first passage, so as to create a counterflow of contaminated material through a filter part in the second passage; and selectively permitting flow of fluid polymeric material from a source thereof into the inlet of the second filtering passage, whilst preventing such flow into the first passage, permitting a flow of material through the secondary outlet of the first passage, and exposing the first passage to the pressure of material from the second passage, so as to create a counterflow of material through a filter part in the first passage.

Viewed from a further aspect, according to an invention disclosed herein there is provided a process for filtering fluid polymeric material in apparatus comprising first and second filtering passages each of which has;

(a) an inlet for material to be filtered and an outlet for filtered material;

(b) an inlet port and an outlet port for a filter to be passed through the passage, at a location situated between the material inlet and material outlet;

(c) means for selectively introducing a fresh filter part into the passage through the inlet port and for removing a used filter part through the outlet port; and (d) cooling means for forming seals in the inlet and outlet ports in the form of plugs of the material being filtered or of another material, the plugs being moveable at least partly under the influence of the pressure of material in the passage so as to move during movement of a filter part;

the process comprising the steps of selectively permitting flow of flowable material from a source thereof into the inlet of the first filtering passage, through a filter part therein and from the outlet thereof, whilst restricting such flow into and through the second passage, exposing the second passage to the pressure of material from the first passage, and using such pressure to effect or assist movement of a filter part in the second passage by extrusion in the direction of filter advance of a sealing plug in the outlet port thereof; and selectively permitting flow of such material from a source thereof into the inlet of the second filtering passage, through a filter part therein and from the outlet thereof, whilst restricting such flow into and through the first passage, exposing the first passage to the pressure of material from the second passage, and using such pressure to effect or assist movement of a filter part in the first passage by extrusion in the direction of filter advance of a sealing plug in the outlet port thereof.

A serious problem with known counterflow systems is the poor performance of valves which are used to regulate the counterflow out of the filter passage. Typically these are of metal to metal construction utilizing tight clearances. It is difficult to achieve effective sealing under the high pressures experienced during normal use and abrasive contaminants such as concrete dust tend to damage the valves leading to periodic seizures.

It has now been found that it is possible to control a counterflow system by using plugs of at least partially solidified polymer. Such an arrangement is of use in a wide range of filtering systems and not simply those described above.

Thus, there is provided apparatus for filtering fluid polymeric material comprising first and second filtering passages each of which has;

(a) an inlet for material to be filtered and an outlet for filtered material;

(b) means whereby a filter part may be disposed across the passage at a position between the inlet and outlet;

(c) a secondary outlet between the material inlet and a filter part in use; and (d) means for selectively permitting or preventing movement of material through the secondary outlet;

the apparatus further comprising flow control means for selectively permitting flow of flowable materials such as fluid polymeric material from a source thereof into the inlet of the first filtering passage, whilst preventing such flow into the second passage, and for selectively permitting flow of flowable material from a source thereof into the inlet of the second filtering passage, whilst preventing such flow into the first passage, the outlets for filtered material of the two passages being communicable with a common destination for filtered polymeric material, whereby either passage may operate in a counterflow condition whilst filtering continues through the other passage, in which condition the flow of material into the inlet is prevented, a flow of contaminated material through the secondary outlet is permitted, and the pressure of material from the outlet of the other passage causes a counterflow through a filter part and out of the secondary outlet;

wherein each secondary outlet is provided with cooling means for selectively forming a sealing plug of the material being filtered or of another material, which can be used to prevent movement of material through the secondary outlet and which can be displaced to permit movement of material through the secondary outlet and the removal of contaminants.

Thus in use closing of the secondary outlet will be effected by a plug made of e.g. the polymeric material being filtered. The seal is not dependent on accurate machining of cooperating metal parts and its effectiveness is not reduced by the presence of abrasive contaminants such as concrete dust or metal swarf in the polymer.

In most practical embodiments the plug will be formed directly from the polymer which flows through the secondary outlet. However, it might be possible to use polymer from a different source.

In one simple but effective embodiment, the secondary outlet is in the form of an elongate conduit in which a sealing plug is formed by cooling so that the conduit is sealed directly. To displace the plug, it will generally be advantageous to provide heating means. However, in some cases transmitted heat from the polymer which has been heated to render it substantially fluid will be sufficient and control of the plug can be effected by the cooling means alone or by mechanical traction or both.

During a counterflow operation the plug can be thermally softened sufficiently for it to be displaced from the conduit by pressure of the polymeric material as contaminated polymer enters the conduit. A fresh hardened plug would then be formed again by the cooling means before the termination of counterflow. Mechanical traction can also be exerted on either a cold or a heated plug.

Thus, viewed from one aspect an invention disclosed herein provides a process for filtering fluid polymeric material in filtering apparatus comprising first and second filtering passages each of which has;

(a) an inlet for material to be filtered and an outlet for filtered material;

(b) means whereby a filter part may be disposed across the massage at a position between the inlet and outlet;

(c) a secondary outlet situated between the material inlet and a filter part in use; and (d) thermal control means for selectively permitting or preventing movement of material through the secondary outlet by controlled formation and movement of a sealing plug therein of at least partially solidified polymeric material;

the process comprising the steps of selectively permitting flow of fluid polymeric material from a source thereof into the inlet of the first filtering passage whilst flow through the secondary outlet of the first passage is prevented by means of a sealing plug formed therein, so as to filter the fluid polymeric material and pass it to the outlet; subsequently terminating the flow into the inlet of the first passage, whilst permitting flow into the inlet of the second passage, whose secondary outlet is provided with a sealing plug to prevent flow therethrough, so that polymeric material is filtered in the second passage and passed to the outlet; and carrying out a counterflow operation in the first passage which comprises the steps of:

permitting the first passage to be exposed to the pressure of filtered polymeric material from the outlet of the second passage and using the thermal control means in such a way that the sealing plug in the secondary outlet of the first passage becomes moveable; whereby the pressure of material from the outlet of the second passage causes a counterflow through the filter part; in the first passage to flush contaminants therefrom, and also causes, at least in part, movement of the sealing plug through the secondary outlet of the first passage, whereby contaminated material passes into the secondary outlet;

the process further comprising the steps of subsequently using the thermal control means in such a way that movement of material through the secondary outlet of the first passage is prevented by a sealing plug therein; permitting flow when desired into the inlet of the first passage to enable filtering therein; and carrying out the counterflow operation in the second passage.

In an arrangement using the direct formation of a sealing plug in the secondary outlet, movement of the plug could be effected mechanically at least in part. The secondary passage may be formed with a constriction to assist in preserving the seal. Cooling means and heating means may be provided as desirable. In practice the secondary outlet could resemble an outlet port of the type used for a filter, as disclosed for example in GB-A-1181075. However, the outlet provided here will generally be of greater length than such a port and will not contain a filter.

It will be appreciated that in normal practice of the various processes described herein the steps will be repeated and there will be a continuous cycle of filtering taking place in one passage whilst another operation is carried out in the other, and then reversing the situation. There will normally also be periods when filtering takes place through both passages. Furthermore, more than two filtering passages may be provided which can be operated in a similar manner, with filtering and other operations being carried out in appropriate combinations so as to achieve the desired result.

There has also been developed an alternative arrangement for opening and closing the secondary outlet by means of a plug of substantially solidified polymer, which can be used to control the flow of material at other locations also, for example to permit or prevent flow into the inlet of a filtering passage.

Thus, according to one aspect of an invention disclosed herein there is provided apparatus for filtering fluid polymeric material comprising a filter passage having an inlet communicable with a source of fluid polymeric material, an outlet, means for disposing a filter part in the passage between the inlet and outlet, and flow control means for a conduit through which the material may pass, the flow control means comprising:

(a) a side passage extending laterally from and in flow communication with the conduit;

(b) cooling means for the side passage, operable to form therein a plug of solidified polymeric material whilst flow of material is still permitted through the conduit; and (c) means for urging the plug from the side passage into the conduit so as to restrict the flow of material therethrough.

The heat of the polymeric material in the conduit would normally tend to melt the plug so as to permit flow again. Under some circumstances, if only a short and possibly partial restriction of flow was required, it might be acceptable to allow this to happen. Preferably, however, there are provided cooling means in the region where the plug will block the conduit so that flow restriction can be maintained for as long as desired. A constriction may be provided in the conduit to assist in locating the plug.

When flow through the conduit is to be re-established, the region of the plug may be heated, either by simply terminating cooling or by also applying heat using suitable means. Mechanical force may also be applied to the plug to effect or assist in its displacement.

Once a plug has been used, another plug has to be formed in the side channel by cooling. In some cases the time necessary for this to be done may be excessive and until a fresh plug is formed a cycle of closing, opening and then closing the conduit again cannot be completed. In such cases, two or more side channels may be provided so that plugs are available in turn. Furthermore, cooling of the plug can be hastened if its cross section is elongated, i.e. if the plug has a long periphery for a given cross-sectional area. It may also be advantageous to provide the plug with an insert of good thermal conductivity, such as a metal pin, at least whilst it is in the side passage. This will assist in conducting heat away from the material forming the plug and increase the speed of solidification.

Preferably, the insert does not project far into the conduit when the plug is moved, so as to avoid contact with large particulate contaminants in the conduit.

It is advantageous to arrange for the end of a plug in the side passage, adjacent the conduit, to be somewhat softer than the remainder of the plug. If there are any contaminants in the conduit, the softened end will mould itself over these, so that effective sealing can still be achieved against the walls of the conduit. This can be achieved even with large contaminants such as swarf or pebbles. The heat of the material in the conduit may be sufficient to achieve this local softening, but the construction and arrangement of the conduit, side passage and cooling means can be adjusted so as to bring it about.

The plug in the side passage may be moved into the conduit by mechanical means, and/or by hydraulic or pneumatic means. Typically it will be acted upon by a piston which is reciprocable within the side passage. The temperature in the side passage may be temporarily increased so as to facilitate movement of the plug by reducing friction between the plug and the side chamber walls. This may be achieved by adjusting the cooling means, and/or by operating heating means for the side passage. The piston may be provided with an extension projecting into the plug to assist in cooling, and the piston itself is preferably heat conducting, e.g. made of metal.

By providing a suitable bleed passage, material to form a new plug could be supplied to the side passage behind the plug which is in the conduit, this plug preferably having a portion still in, and sealing, the side passage. Indeed, the side passage could contain an elongate sealing plug which is replenished by the solidification of fresh molten material at the end remote from the conduit. However, for simplicity, preferably fresh material enters the side passage from the conduit when the plug is displaced from the conduit, mechanically and/or by melting. It is necessary to seal the side passage at the end remote from the conduit. If a loosely fitting piston is used to act upon the plug, sealing can be achieved by means of a thin film of solidified polymer between the piston and the cooled walls of the side chamber. The piston itself could be cooled although normally cooling of the side chamber suffices.

In some embodiments, the plug is moved under the influence of the hydraulic pressure of fluid polymer. This can be achieved by means of a hydraulic intensifier having a relatively large area piston exposed to the pressure of the molten polymer, connected e.g. by a piston rod to a relatively small area piston which will be used to urge the plug into the conduit against the pressure of the fluid polymer therein.

Either piston could be made from any suitable material such as metal. However, the pistons can advantageously be made at least in part from cooled and sufficiently rigid polymer. The sealing plug itself could constitute the small piston, separated by fluid polymer from the larger cross-section piston, but coupled to it, for example by a piston rod.

These flow control means can be of particular use in the case of a diverter valve arranged to switch the output from an extruder to one or the other of two filtering passages. In such a case, two flow control means are provided to act in parallel and a common actuator can be provided. Preferably the arrangement is such that the two side passages are axially aligned. A common actuator such as a double ended hydraulic or pneumatic cylinder can be used to actuate both. With both valves open, the forces due to the pressure of the polymer acting on this actuator on both sides will be equal so that the actuator only has to overcome the frictional forces on the two plugs. As noted above, heating the side passages can reduce such frictional forces during actuation.

Whether an actuator is provided for single flow control means, or a double acting actuator for e.g. two flow control means constituting a diverter valve as discussed above, the pressure of fluid polymer can be applied to alternate sides of a piston to effect reciprocable movement. The fluid polymer can be directed to either side by means of a simple flow control valve comprising a temperature controlled block with a comparatively small flow channel through it. The side of the piston which is not subject to melt pressure will be vented.

The flow control means may be of use in contexts other than the filtering of fluid polymer.

Thus viewed from one aspect an invention disclosed herein comprises flow control means for selectively permitting or limiting a flow of fluid through a conduit, comprising a side passage extending laterally of and communicating with the conduit, the side passage being adapted to contain therein an at least partially solidified sealing plug of thermoplastic material, actuating means for urging the sealing plug into the conduit so as to limit fluid flow therethrough, and thermal control means associated with the conduit for selectively augmenting or reducing the degree of solidification of the sealing plug.

In the preferred embodiments the flow control means is used to control a flow of fluid polymer and the sealing plug is formed by solidifying a quantity of the polymer that has entered the side passage.

The use of a sealing plug which is of thermoplastic material means that, under the appropriate thermal conditions, the plug will adapt to the shape of the conduit and will form an effective seal against its walls. As noted earlier, the seal can be formed regardless of the presence of contaminants in the conduit. As the plug reforms continually, the valve cannot be permanently damaged, or jam up as a result of contaminants.

In a preferred embodiment the flow control means comprises a first housing part defining part of the conduit for fluid flow, and a second housing part defining the side passage extending laterally of and communicating with the conduit, the two housing parts being connected by a portion of reduced thermal conductance, such as a relatively narrow portion, to provide a degree of thermal isolation.

In the preferred embodiments of polymer filtering using the apparatus and processes described above, in conditions of high contamination, filters are periodically cleaned, re-used, and then replaced when cleaning becomes ineffective. This can be achieved without interruption of the overall filtering operation, and without using manual labor. The integrity of the apparatus is maintained despite the presence of abrasive contaminants. Filter parts can be moved without risk of breakage, even if inexpensive, lightly constructed filters are used. Flow control is carried out in an effective manner. Many novel and inventive features and combinations of features are disclosed above and in the specific description below, and protection is sought for all of these.

Some embodiments of apparatus and processes utilizing the inventive features described above will now be described by way of example and with reference to the accompanying drawings in which:

BRIEF DESCRIPTION OF THE DRAWINGS

FIG. 16b is a partial plan view of the valve unit of FIG. 16a;

FIG. 16d is a partial plan view of the valve unit of FIG. 16a;

DESCRIPTION OF THE PREFERRED EMBODIMENT

Figure 1:
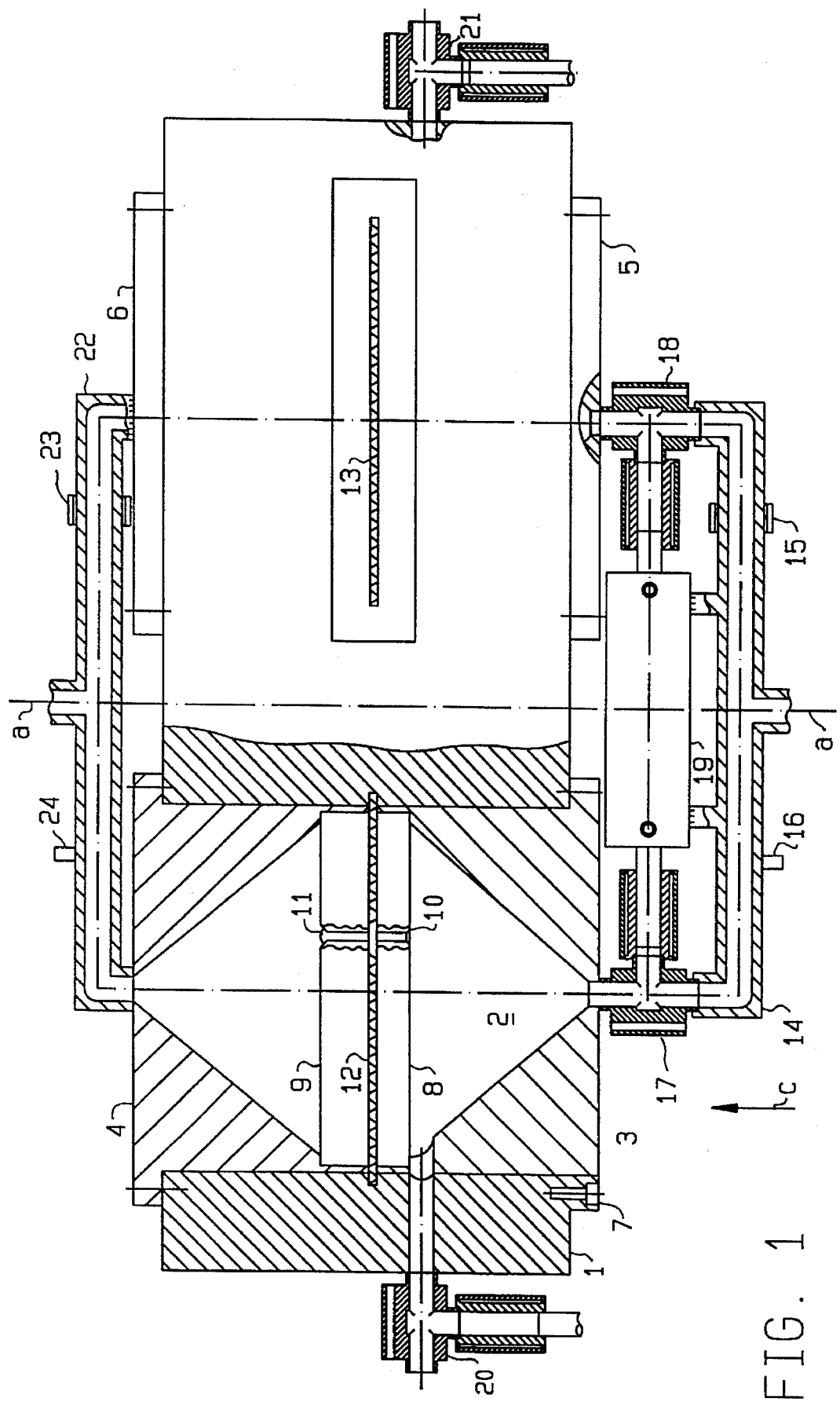
FIG. 1 represents a partly sectioned plan view of filtering apparatus.

Referring to FIG. 1 filter body 1 contains two similar cylindrical filtering apertures disposed side by side, one of which is shown sectioned at 2. The filtering apertures contain conically hollowed-out end caps 3, 4, 5 and 6 which are bolted onto filter body 1 by means of bolts, one of which is shown at 7 and each end cap carries a perforated supporting disk, two of which are shown at 8 and 9, each provided with numerous, aligned perforations such as 10 and 11. Suitable filters 12 and 13 made, for example, from woven steel cloth pass between each pair of supporting disks.

Manifold 14, provided with band heaters one of which is shown at 15 and a pressure transducer 16, carries molten plastic and feeds it to the two filtering chambers via two valves 17 and 18 which are actuated when desired by means of a double-ended pneumatic cylinder 19.

Each filtering aperture is provided with a purge valve such as 20 and 21. Filtered plastic, which has passed through either filter 12 or filter 13, is collected by means of manifold 22 which is heated by means of band heaters, one of which is shown at 23 and with a further pressure transducer 24; plastic enters and leaves the apparatus in the direction of a—a.

In operation, with both filters 12 and 13 substantially unclogged as determined by the pressure difference measured by the transducers 16 and 24, valves 17 and 18 are open and valves 20 and 21 are closed so that substantially molten plastic—provided for example by an extruder feeding manifold 14—is filtered simultaneously in both filtering chambers and is collected by manifold 22 and passed, for example, to a granulator.

When the difference between the pressures upstream and downstream of the filters reaches a pre-set limit one of the inlet valves associated with one of the two filtering chambers, say 17 is closed and the associated purge valve communicating with the same filtering chamber, here 20 is opened. Substantially molten plastic driven by the downstream pressure within manifold 22 flows through one of the filters, here 12, in a direction opposite to that which the plastic follows during filtering and a proportion of the impurities collected on filter 12 will be dislodged and carried out of the filtering chamber through purge valve 20. When the bulk of the collected impurities has been disposed of, purge valve 20 is closed again and filtering re-commences through both filters. When the difference between the upstream and downstream pressures rises again to the pre-set limit, the other filter, here 13, situated in the neighboring filtering chamber is similarly cleaned by the removal of contaminants using counterflow through purge valve 21.

This sequence of filtering and purging operations is repeated a number of times until following a purging operation the difference between the upstream and downstream pressures no longer returns to a sufficiently low value, indicating that filter cleaning is no longer efficient enough.

At this stage plastic flow to one filtering chamber is shut off by means of, for example, valve 17 and, with both purge valves 20 and 21 closed and while filtering proceeds through filter 13, filter 12 is moved through filtering chamber 2 in a manner similar to that described in GB-A-1181075 but with one important difference: since filtering does not proceed across the filter being moved there is here no pressure differential across the moving filter 12 which can, accordingly, move easily and free of friction against the two perforated supporting disks 8 and 9 despite the severe clogging which filter 12 will by now be subject to.

Having moved filter 12, valve 17 is reopened and valve 18 is closed, with purge valve 21 still closed, so that filter 13 can be moved in turn with no pressure differential across it whilst filter 12 is filtering. Thereafter filtering again proceeds with both valves 17 and 18 open until there is sufficient clogging to require cleaning the filters once again by counterflow.

It will be seen that, unlike using apparatus described in GB-A-1181075, the present apparatus does not provide constant pressure conditions in operation but, with the use of suitable automatic supervisory controls monitoring its two pressure transducers, it does permit continuously filtering even heavily contaminated plastic materials without requiring operator supervision until its filter supply is exhausted and owing to its filters being moved in the absence of differential pressure across the moving filter, it can operate using inexpensive, lightly constructed filters; since these filters are continuously cleaned their useful life is greatly extended leading to further economies of operation.

Figure 2:
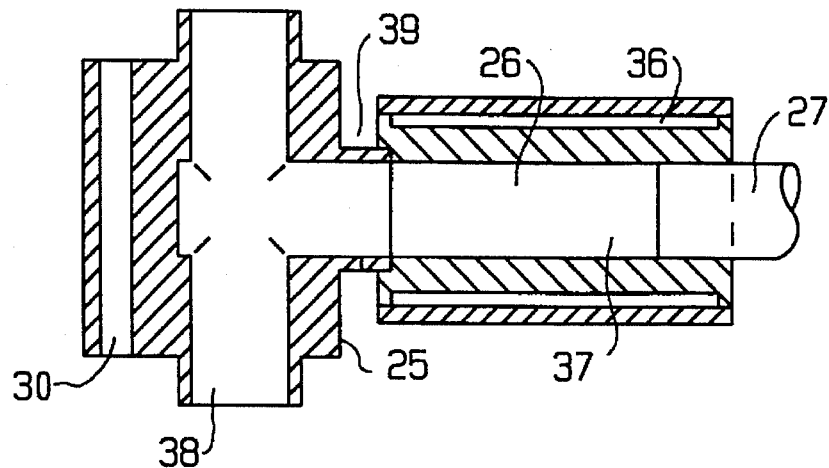
FIGS. 2 and 3 represent a sectioned plan view and a sectioned side elevation of flow control means.
Figure 3:
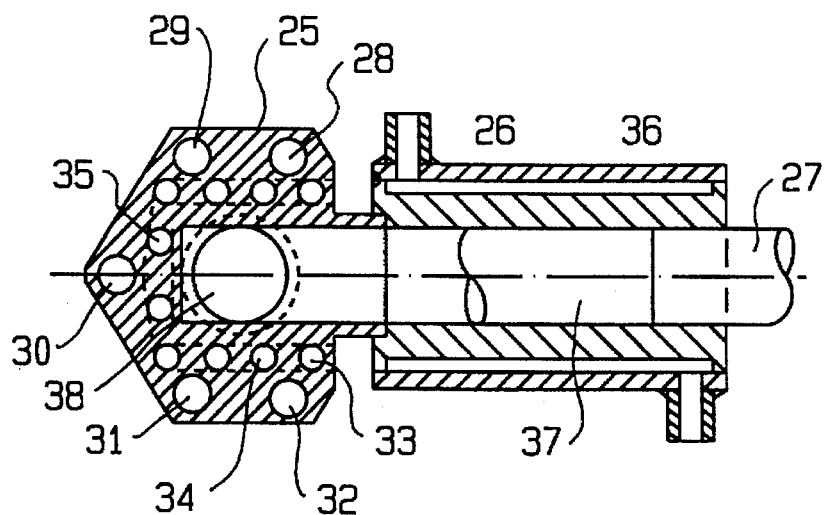

An important feature of the apparatus is the provision of novel flow valves for the plastic such as 17,18 and particularly 20 and 21 which must control the flow of plastic with a highly concentrated impurity content without requiring service over very long periods of continued operation. Such a valve will be described in better detail with reference to FIGS. 2 and 3.

The valve consists of a body 25, through which normally molten plastic flows in the direction b, which is provided with a side chamber 26 containing a piston 27 which can be reciprocated by means such as pneumatic cylinder 19 of FIG. 1 or, in the case of high extrusion pressures, by other means such as a hydraulic cylinder. Valve body 25 can be heated by means of heaters 28,29,30,31 and 32 and cooled by means of coolant flow through channels such as 33,34 and 35; cylindrical side chamber 26 is cooled by the flow of a suitable coolant such as water flowing in the annular space 36 surrounding it so that a substantially rigid plastic plug 37 forms in it, acting as a pressure seal. This plug is delimited on one side by the valve body and on the other side by operating piston 27.

When the valve is to be open flow channel 38 within its body is kept at a temperature at which the plastic being processed can flow. Neck 39 situated between the now hot body 25 and the cold side chamber is of a reduced cross-section so as to minimize heat conduction. When it is desired to close the valve, piston 27 is moved so as to force plug 37 into flow channel 38, closing it and valve body 25 is cooled so as to keep plug 37 sufficiently rigid and in situ. Reopening the valve is achieved by reheating valve body 25 so that its contents remelt and piston 27 is withdrawn to its original, outer position as shown. Fresh, hot plastic now enters sidechamber 26 and a new plug 37 begins to form.

It will be seen that, since the valve achieves its tight shutoff without the necessity of metal-to-metal contact and re-forms its tight, sealing abutment every time it is operated it can tolerate the presence of even large and abrasive contaminants such as metal swarf or pebbles which, if they are located in the flow channel when the valve is shut, become imbedded in the plug forming the seal without impairing its operation. The temperature of the inner end of plug 37, next to the valve body, can be adjusted by making neck 39 longer or shorter and the wall of the neck thicker or thinner: it is advantageous to allow that inner end to remain moderately warm so that it remains pliable enough to facilitate this embedment.

Figure 4:
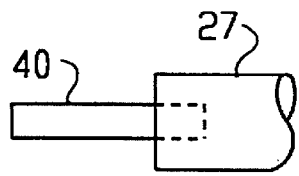
FIG. 4 represents an improved detail of part of FIG. 2.

The speed with which the valves can be operated is an important parameter of the apparatus described since it defines the worst-case contamination which the apparatus can still cope with and this speed depends on the time taken to cool plug 37. One way of hastening this consists in making the sidechamber cross-section, and hence plug 37, flat so that the core of its cross-section is more accessible to cooling. Another way is shown in FIG. 4 where piston 27 is provided with a pin 40 made from a material of good thermal conductivity such as a metal; this helps the cooling of plug 37 from within and it also supports plug 37 when it is thrust into flow channel 38: it is however best to make pin 40 sufficiently short so that it does not enter channel 38 too far and makes no contact with particulate contaminants carried in the flow.

Another way of speeding up valve operation consists in providing the valve with more than one side channel and hence, more than one plug; these plugs can then close the flow in the valve in turn so that one plug operates while another is being formed. A two-side-chambered valve is shown in FIGS. 5 and 6 which operates like that described above but can achieve a faster repetition rate.

Pistons 40 and 41, situated in side chambers flanking valve body 44 are taking turns closing valve bore 45. Both pistons 40 and 41 are pulled outwards while the valve is open and valve body 44 is kept heated by heaters such as 47. When the valve is to close, one of the pistons is pushed inward, assuming the position of piston 41 so that the plug formed in side chamber 43, not shown, is forced into bore 45 closing the valve; the heaters 47 in valve body 44 are switched off and a suitable coolant such as water is circulated in coolant channels such as 46 so as to stabilize the cold plug in the valve body. Meanwhile a fresh plastic plug is cooling in chamber 42 whose piston 40 is in its outer position as shown. The valve is reopened to flow by reheating it and by stopping coolant flow in its coolant channels such as 46 and piston 41 is withdrawn: however no sooner has plastic flow resumed through valve bore 45 it can, if desired, be stopped once more by actuating piston 40 whilst a fresh plastic plug is forming in side chamber 43. It will be clear that more than two side chambers can be employed if an even faster repetition rate is desired.

Figure 5:
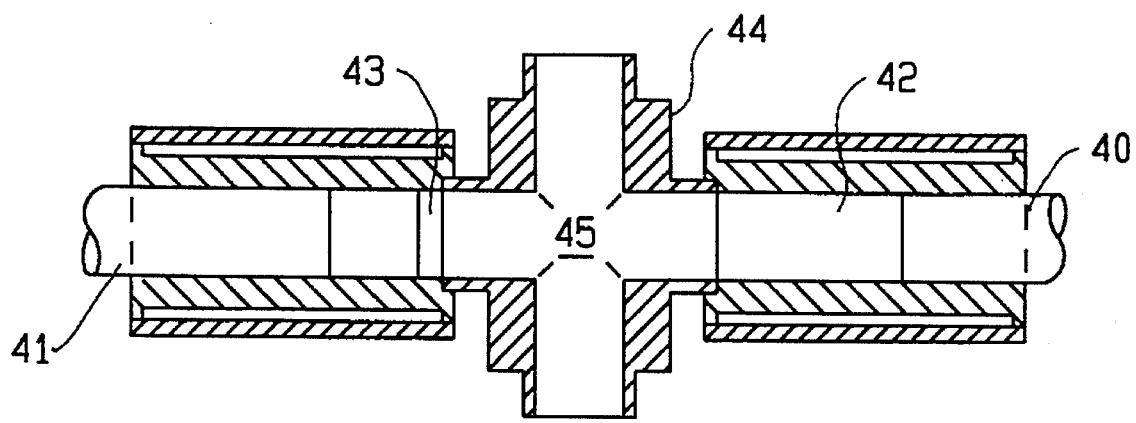
FIGS. 5 and 6 represent a sectioned plan view and a sectioned side elevation of another flow control means.
Figure 6:
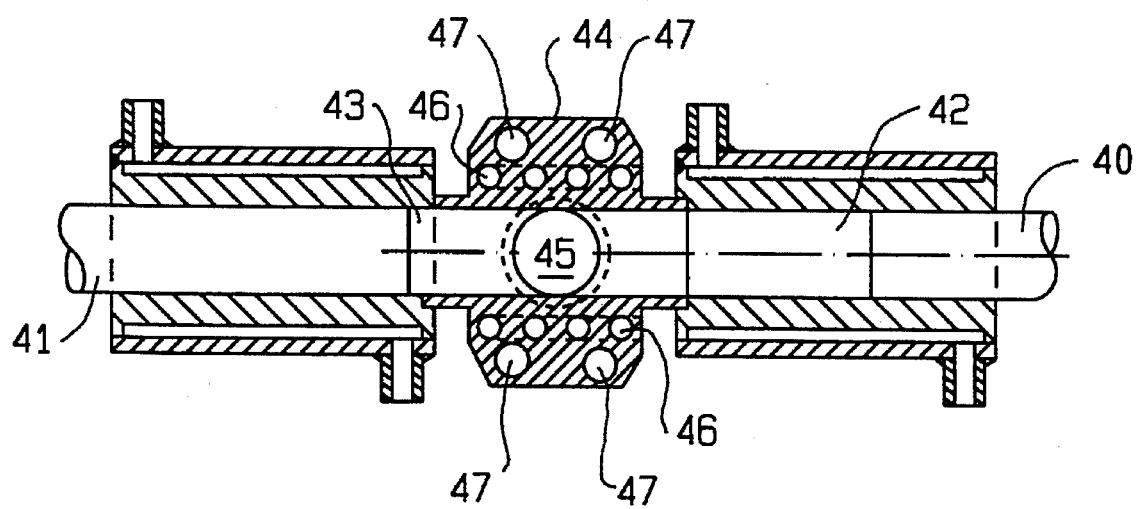

Pistons 40 and 41 of the valve arrangement shown in FIGS. 5 and 6 can also be actuated by a common means as shown in FIGS. 16. Pistons 40a and 41a are both fastened to a frame 101 which is reciprocated by a double-acting pneumatic or hydraulic cylinder 102 which is fastened to valve body 44a by means of struts 102a. Clearly two valves such as 44a can also be utilized in place of valves 17 and 18 if faster repetition is required.

Figure 15:
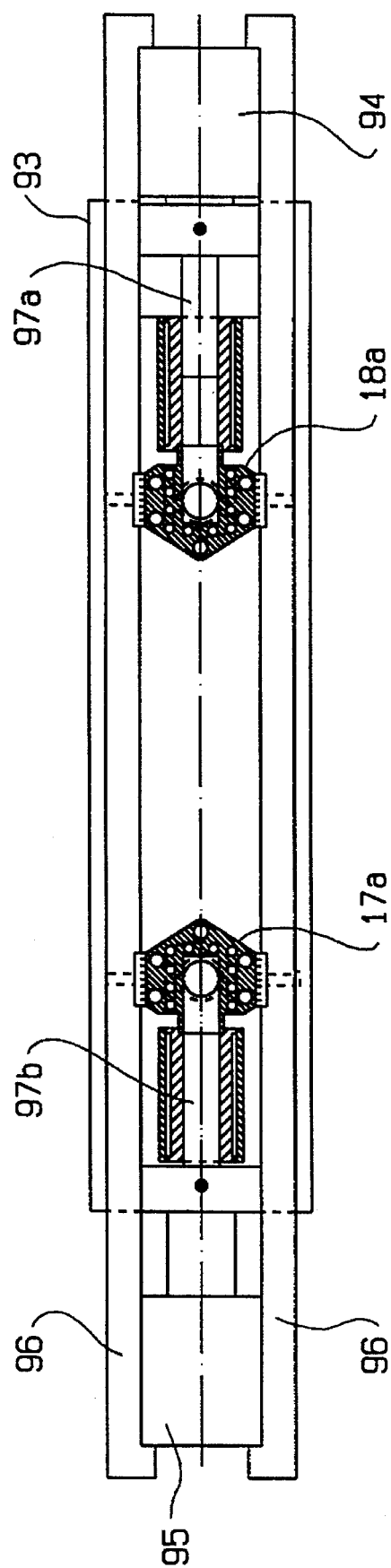
FIG. 15 is a side elevational view of a double valve arrangement.
Figure 15A:
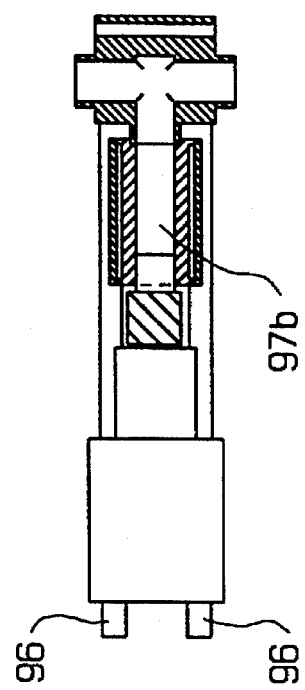
FIG. 15a is a partial plan view of one of the valves of the double valve arrangement of FIG. 15.
Figure 16A:
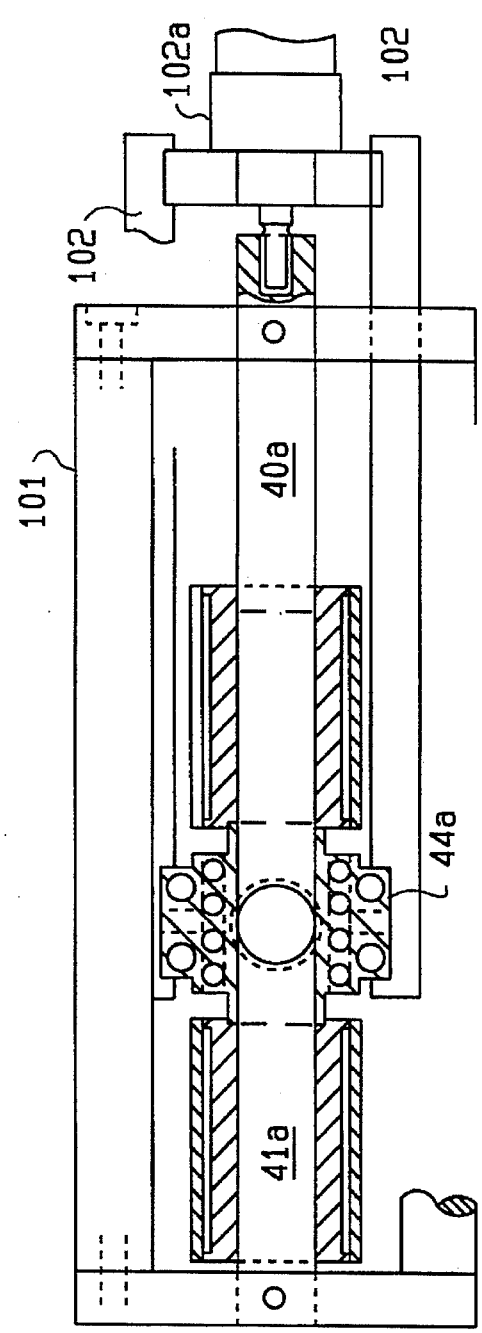
FIG. 16a is a side elevation view of an alternative double piston operated valve.
Figure 16B:
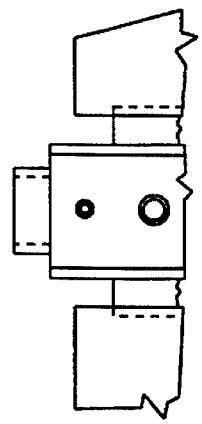
Figure 16C:
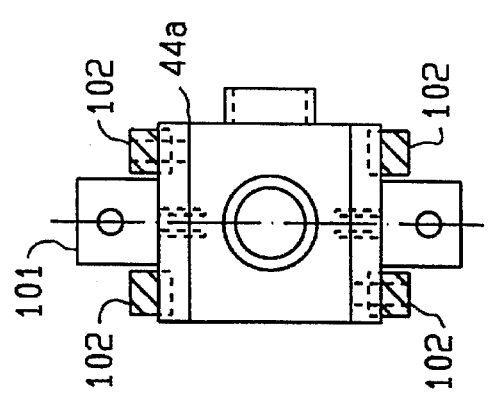
FIG. 16c is an end view of the valve body of valve unit of FIG. 16a with frame removed.
Figure 16D:
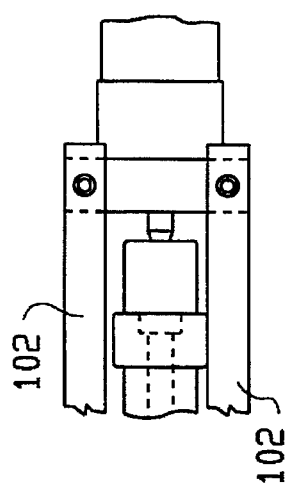

The valve arrangement shown in FIG. 1 is actuated by valve operating means 19 situated between the valves 17 and 18. An alternative arrangement in which the operating means are situated outside the valves is shown in FIGS. 15 and 15a. Valves 17a and 18a here have their pistons 97a and 97b oriented outward and fastened to frame 93 which is reciprocated by hydraulic cylinders 94 and 95 actuated in turn, the hydraulic cylinders being fastened to supporting struts 96 which are affixed to body 1 by means not shown.

Figure 7:
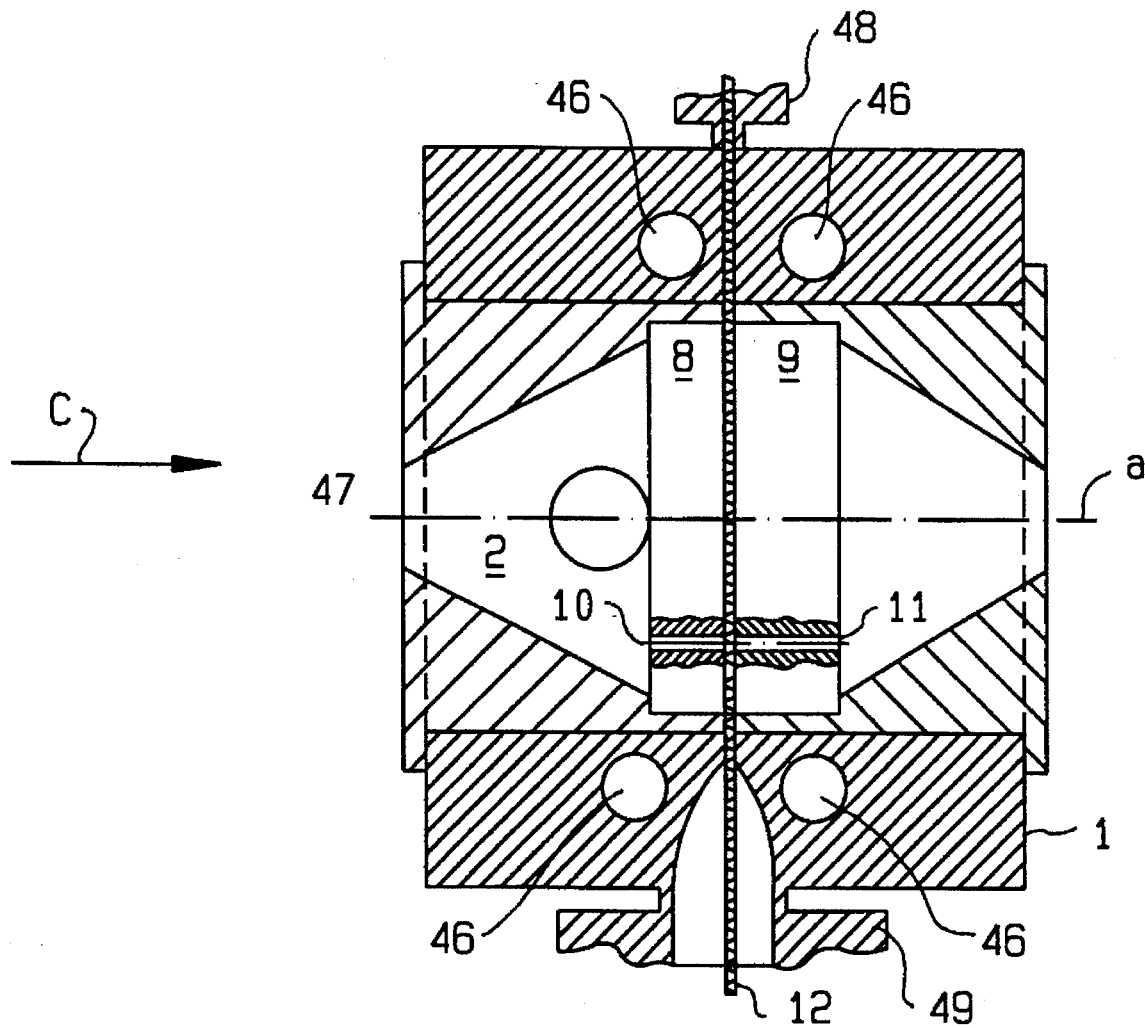
FIGS. 7 and 8 represent a sectioned side elevation and a partly sectioned end view of a filtering chamber.
Figure 8:
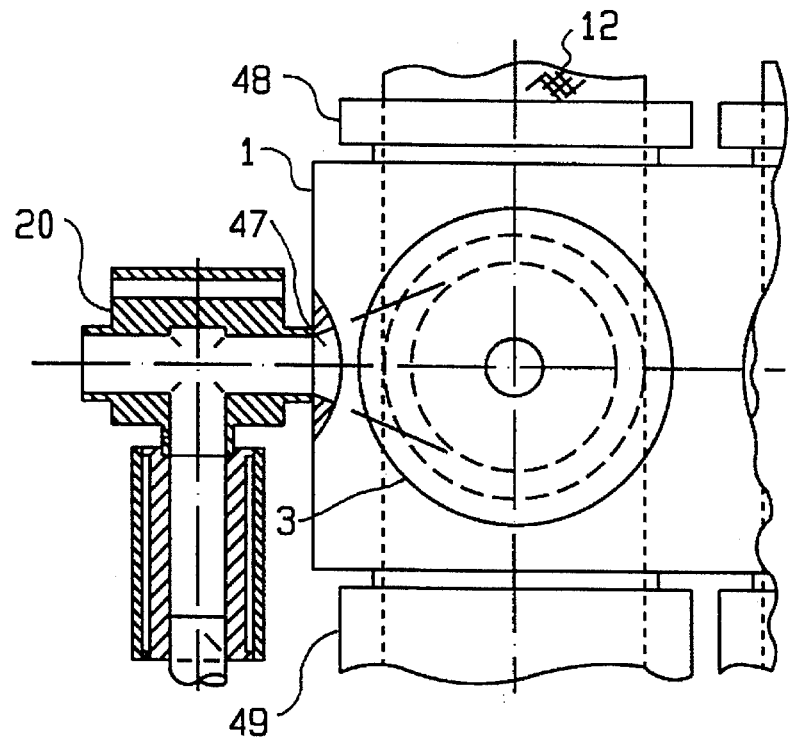

FIGS. 7 and 8 represent an axial section taken in direction b—b of FIG. 1 and an end view seen from the direction c, with manifold 14 and valves 17 and 18 removed for clarity; purge valve 20 is shown as a revolved section. Body 1 is heated to processing temperature by heaters such as 46 and during filtering plastic flows through chamber 2 in the direction a; purge valve 20 is closed at that time. Filter 12 is cleaned in situ when required by closing the inflow of plastic from manifold 14 and by opening purge valve 20 in the manner disclosed above; during this phase plastic flows into chamber 2 in a direction opposite to a and, having transversed supporting disks 8 and 9 and filter 12, this flow leaves chamber 2 through channel 47 and valve 20, taking with it impurities collected by the filter opposite apertures such as 10. When sufficient cleaning has taken place purge valve 20 is closed once more and filtering recommences. It is found that after a number of such cleaning operations this process becomes progressively less efficient and eventually it becomes necessary to introduce a fresh filter part into chamber 2. This is carried out by first stopping the inflow of plastic into chamber 2 by closing valve 17, and, with purge valve 20 still closed, filter 12 is then moved in a manner generally described in GB-A-1181075 while sealing plugs, formed from the plastic being filtered, are maintained in ports 48 and 49 respectively where filter 12 enters and leaves filter body 1, by suitable thermal control means as disclosed e.g. in GB-A-1181075; however since there is no plastic flow through filter 12 at that time this movement takes place substantially free of frictional resistance. Filter advance involves extrusion of the sealing plug in the outlet port 49. This outlet port is of greater cross-sectional area than the inlet port 48, so that there is a net force assisting extrusion, arising from the pressure of material in the passage which is connected to the outlet of the other passage. Preferably the entire contaminated portion of filter within the passage is replaced.

Filter cleaning is alternated between the two filtering chambers as is also the replacement of filters; pressure fluctuations due to these operations can be lessened by utilizing more than two filtering chambers.

Figure 17:
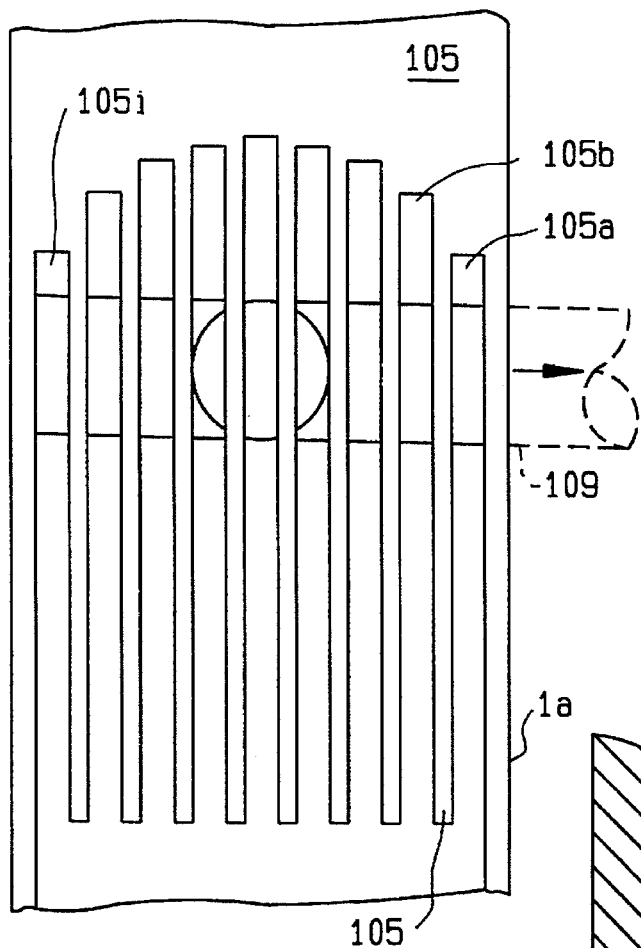
FIG. 17 is an elevational view of one embodiment of a filtering chamber showing the structure of filter support members which support the filter during back flushing.
Figure 17A:
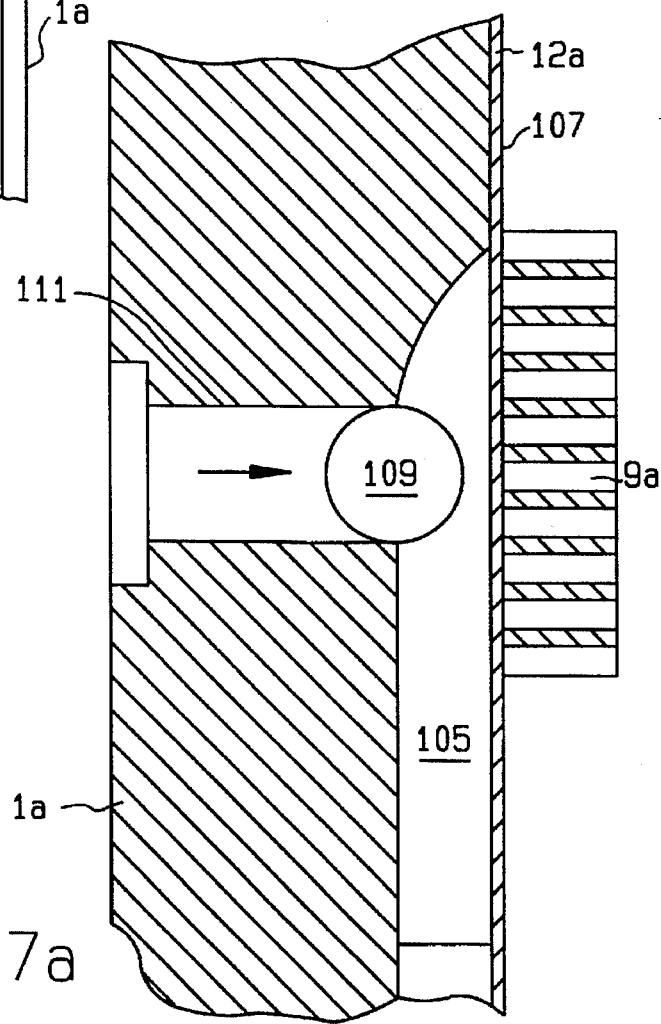
FIG. 17a is a sectional view of the supporting members.

FIG. 7 shows a filtering chamber with two discrete perforated disks 9 and 8 flanking filter 12 and supporting it during filtering and backflushing respectively. FIGS. 17 and 17a show an arrangement in which a supporting structure taking the place of disk 8 is formed by cutting grooves 105a to 105i in filter body 1a; walls such as 105 situated between these grooves support filter 12a during backflushing. Plastic material to be filtered enters along channel 111 and, when this channel is closed during backflushing, the contaminants accumulated on filter 12a within grooves 105 are carried out of filter body 1a along channel 109.

Figure 11:
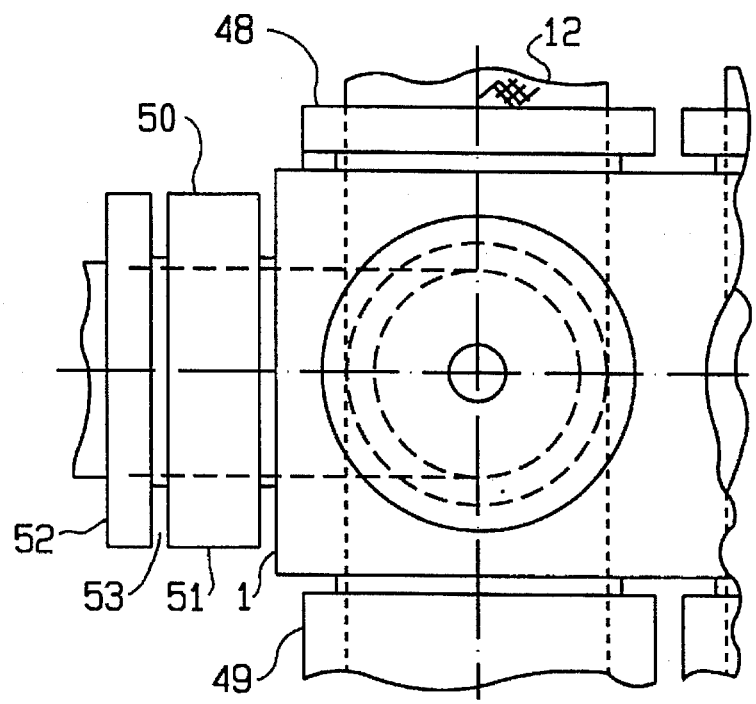
FIGS. 9, 10 and 11 represent two sectioned side elevations and an end view respectively of another filtering chamber.
Figure 9:
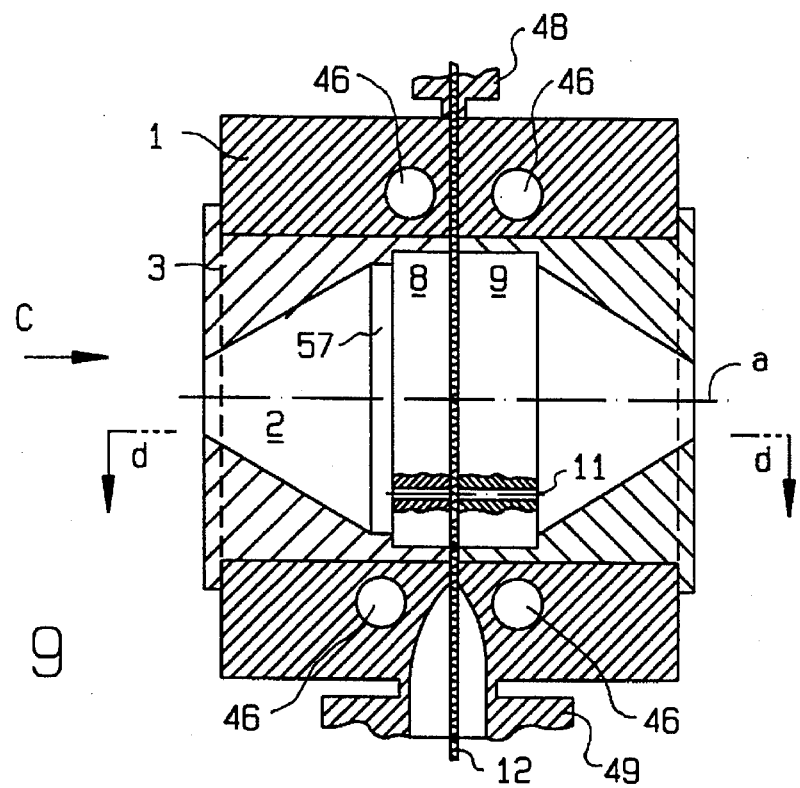
Figure 10:
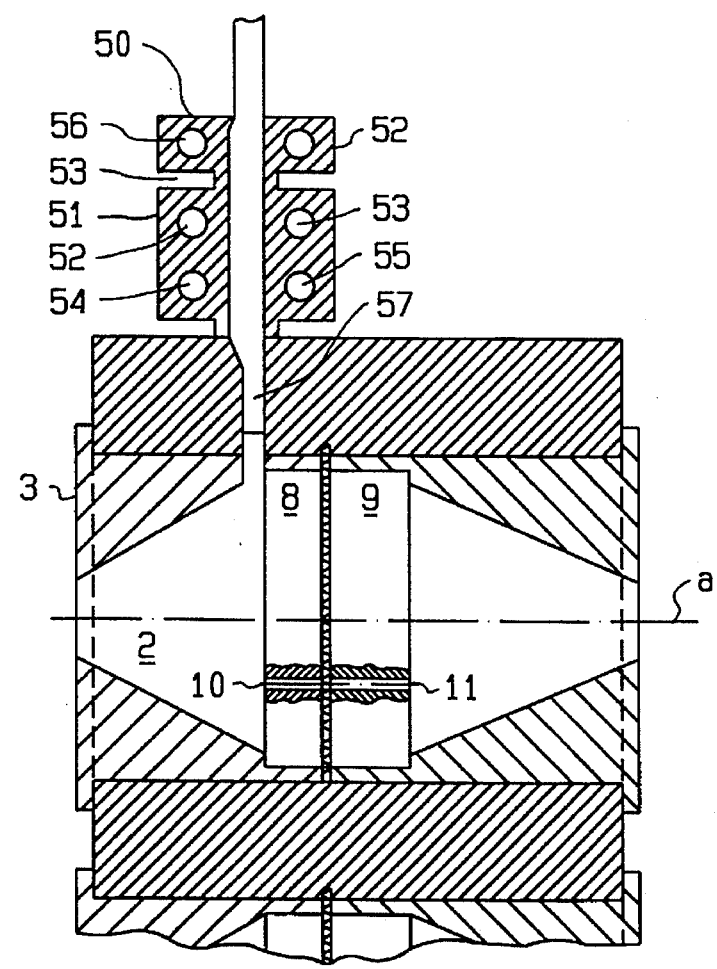

FIGS. 9,10 and 11 represent an axial section taken in direction b—b, an axial section taken at right angles in the direction d—d and a side view taken in the direction c respectively of half or filter body 1 provided with a means of purging chamber 2 alternative to valve 20. Pocket 50 consists of two zones 51 and 52 thermally separated by neck 53. Inner zone 51 is provided with heaters 52 and 53, coolant channels 54 and 55 and outer zone 52 has an internal constriction and is provided with heater 56. During filtering in chamber 2 both zones 51 and 52 are kept cooled so that the plastic within them becomes sufficiently rigid to seal chamber 2 and so prevent any loss of plastic. When it is desired to clean filter 12 heater 56 close to the constriction is heated and it softens the plastic in the pocket in the vicinity of the constriction sufficiently to permit outward movement of the plug situated within pocket 50; this movement is accompanied by a flow of plastic in the opposite sense to a and this flow passes through filter 12, taking with it impurities collected on the filter next to the apertures such as 10 in disk 8 and carrying them into pocket 50 through channel 57. Frictional resistance to the movement of the contents of the pocket may be lessened by heating inner zone 51 also, sufficiently to bring about a detachment from the inner walls of zone 51 and to lessen frictional drag but not so greatly as to unduly hasten the movement of the plug. When a sufficient amount of contaminants has been drawn into pocket 50, a similar amount having been removed from it simultaneously, heating of both zones is stopped and cooling is resumed and subsequently movement of the plug ceases; filtering is then resumed again through chamber 2.

Figure 14:
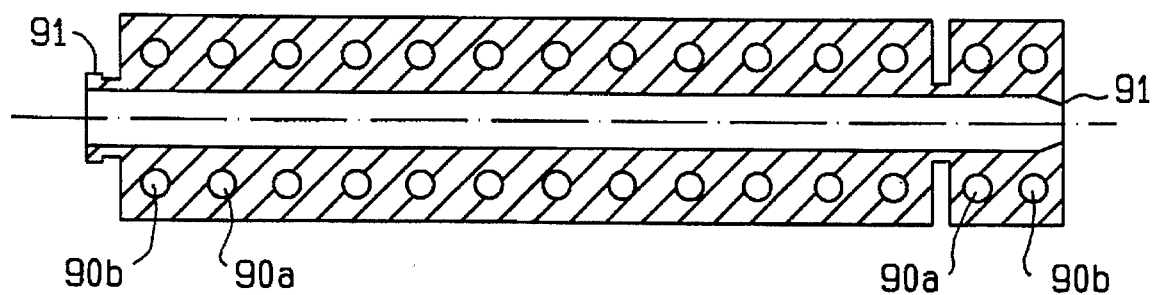
FIG. 14 is a sectioned view of an alternative purge valve.
Figure 14A:
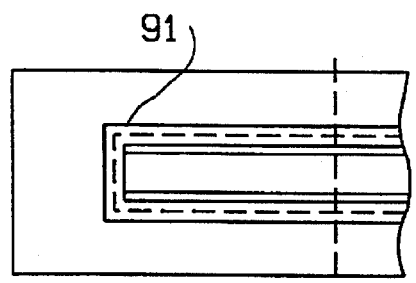
FIG. 14a is a partial end view of the purge valve attachable to the filter body.
Figure 14B:
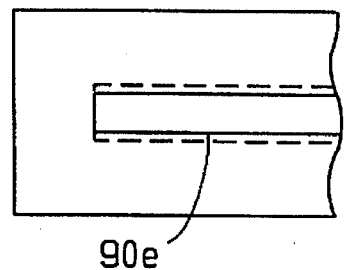
FIG. 14b is a partial view of the end of the purge valve from which purged material exits.

When the removal of comparatively small amounts of impurities suffices to clean the filters sufficiently then a short purge valve shown in FIG. 10 may be employed. When larger amounts of contaminants must be disposed of at a time this valve will be elongated as shown in FIGS. 14. Heaters 90a and cooling channels 90b are provided here in both sections of the valve so that the movement of the plug containing impurities can be swiftly arrested by recooling, the coolant channel near the constriction being particularly effective. The valve is provided with an adaptor section 91 securable to filter body 1 and at the other extremity the end of the constriction is shown at 90e.

Figure 12:
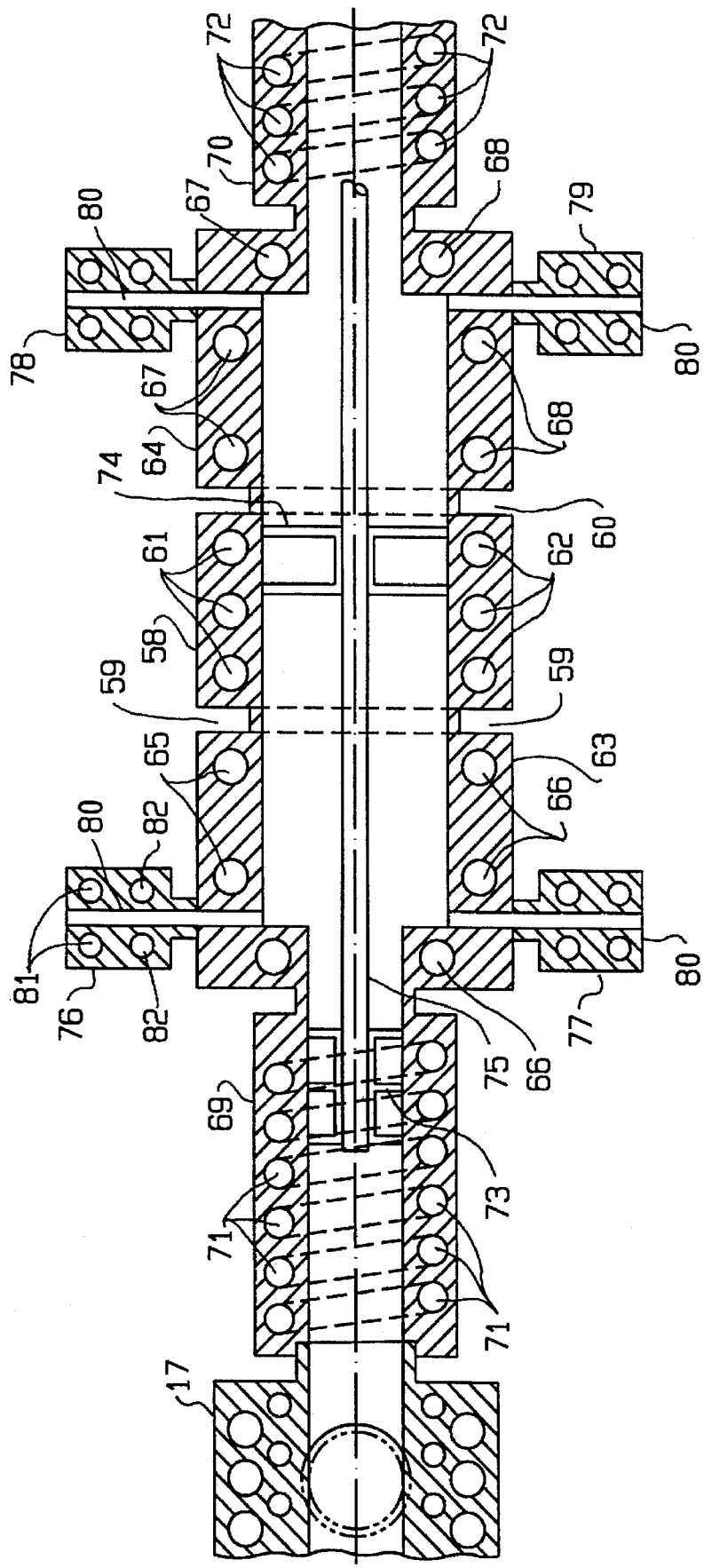
FIG. 12 represents an axial section of an actuator which may form a part of filtering apparatus.

An axial section of a diverter valve suitable for regulating the flow of highly contaminated plastic without requiring external means of power such as hydraulics is shown in FIG. 12.

The diverter consists of an actuator which utilizes the molten plastic being filtered as its working fluid and two valves such as 17 and 18 in an in-line configuration. The tubular actuator is divided by annular necks 59 and 60, which serve to reduce thermal conduction, into a central zone 58 and outer zones 63 and 64. The central zone 58 is cooled by means of a coolant, such as water, flowing in channels 61 and 62 while the two outer zones 63 and 64 are heated to a temperature at which the plastic being processed is substantially fluid by means of heaters 65,66,67 and 68. In use, the actuator contains plastic which is substantially fluid in outer zones 63 and 64 but is sufficiently rigid in central zone 58 to act as a part of a hydraulic piston. The actuator is flanked on each side by a valve of the kind described above; their side chambers 69 and 70 being here cooled by a suitable coolant such as water circulating in channels 71 and 72. The actuator contains three perforated pistons, two of which are shown at 73 and 74, fastened to piston rod 75 and all three are embedded in fully or at least sufficiently rigid plastic plugs, two of which are contained in the respective side chambers of the two valves flanking the actuator and the third, 74 in a plastic plug of a larger diameter situated in central zone 58 of the actuator.

Outer zone 63 is provided with two valves 76 and 77 each consisting of a chamber having a small bore such as 80 communicating with the bore of outer zone 63 and both valves are also provided with temperature control means such as heaters 81 and coolant channels 82. Outer zone 64 is likewise provided with similar valves 78 and 79; in use these valves are open when sufficiently heated to permit the passage of substantially molten plastic under pressure and closed when cold enough to render plastic material contained in them sufficiently rigid so as to resist flow. Valves 77 and 79 are connected to manifold 14 and valves 76 and 78 are open to the atmosphere; it will be seen that when valve 76 is heated and valve 77 cooled then outer zone 63 will contain plastic at atmospheric pressure and when valve 76 is cooled and valve 77 heated then it will contain plastic at the pressure present in manifold 14. Like considerations apply to outer zone 64.

Piston rod 75 may be moved to one side by releasing the plastic pressure in the heated outer zone of the actuator on that side and by pressurizing the plastic in the heated outer zone on the opposite side of the actuator, this being brought about by rendering the plastic within two of valves 76,77,78 and 79 sufficiently rigid by cooling and rendering it sufficiently fluid by heating it in the other two. By reversing the thermal status of these four valves piston rod 75 and the three pistons keyed to it will be moved in the opposite sense. It will be seen that since the outer pistons adjoin the plastic plugs formed within the cooled sidechambers 69 and 70 of the two valves flanking the actuator, such as valve 17 these two valves will be suitably operated by the actuator, the operating force available depending on the ratio of the cross-sectional areas of pistons 74 and 73. Care must be taken that the two valves 76 and 77 serving outer zone 63 are not open simultaneously, the channel such as 80 to be closed being cooled first: in this way the plastic contained in that channel can be made sufficiently rigid while it is at rest so as to close that channel before the other channel communicating with the same outer zone is opened by heating. In this manner there is negligible plastic flow through the channel to be closed and therefore little heat is carried into it by plastic flow so that the closing of the channel by external cooling is facilitated.

Figure 13:
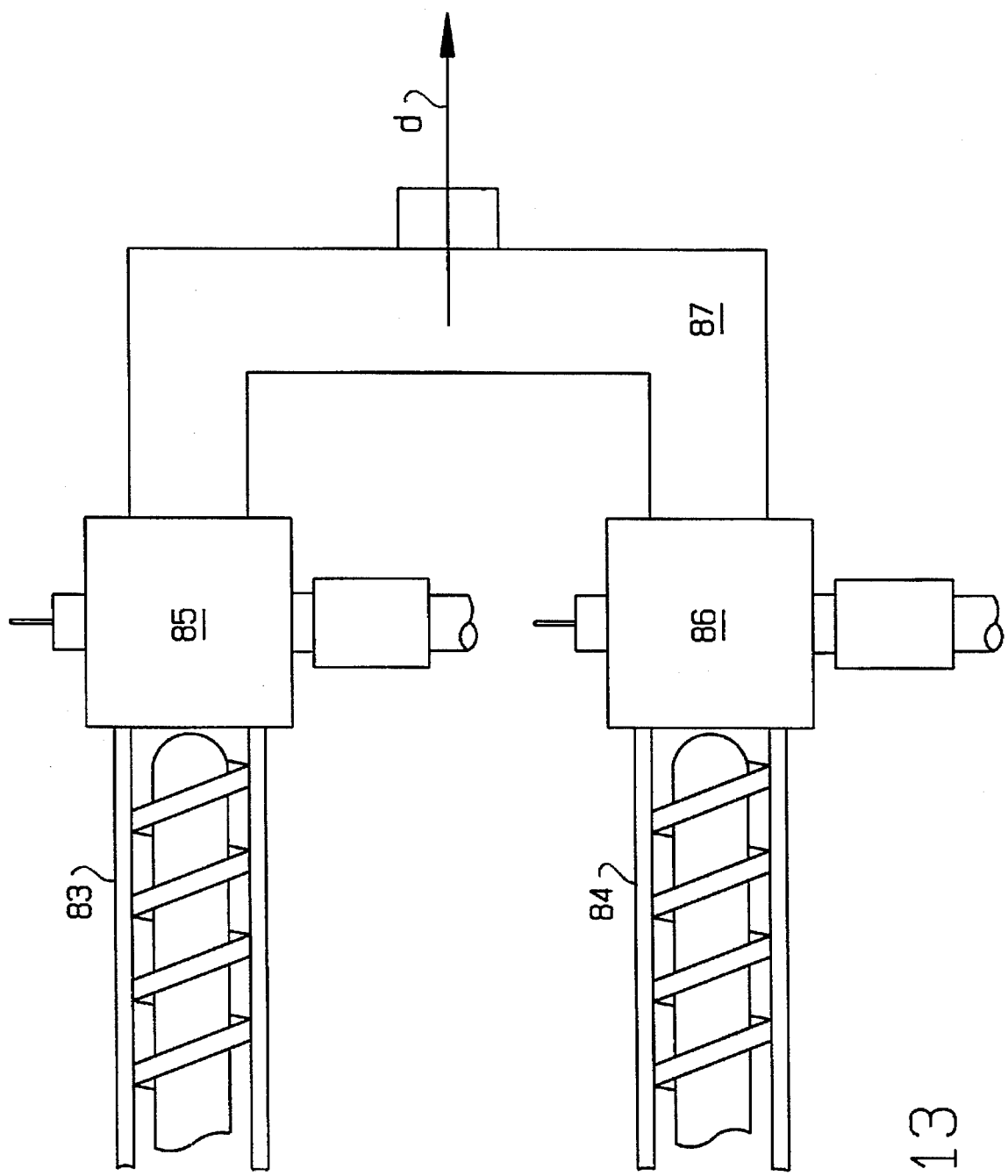
FIG. 13 is an alternative embodiment utilizing two extruders.

FIG. 13 shows a schematic plan view of apparatus according to the invention comprising two extruders 83 and 84 which carry filtering chambers 85 and 86 respectively. The filtered plastic passes from these to a common collecting duct 87 and thence to, for example a pelletizer, in the direction of arrow d.

Certain known features of the apparatus disclosed herein, such as the details of the inlet and outlet ports, are disclosed in GB-A-1181075, the contents of which are incorporated herein by way of reference.

In an example of filtering using the above filtering equipment Polypropylene resin at about 200 degrees Centigrade is made to flow through twin filtering chambers using 6" diameter supporting plates such as 9a; the initial pressure drop across clean filters such as 12 and 13 is typically between 250 and 500 psi. depending on filter construction and the flow rate and viscosity of the polymer. Filtering is continued until the pressure drop across the filters reaches about 3000 psi. when backflushing is initiated; thereafter the pressure drop again returns to near its initial value. After repeated cycles the instantaneous pressure drop after backflushing gradually rises. It will be found that the rate of filter clogging, as indicated by following the pressure drop, is not constant but increases more and more rapidly at higher levels of clogging and at the same time, the efficiency of filter cleaning decreases as seen from the pressure drop immediately following backflushing. For a given filter construction and depending also on the kind of impurities encountered a given value of the pressure drop following backflushing will be found, such as 2000 psi. in the example given, where it becomes necessary to change the filter areas in use so as to avoid having to backflush faster than the valves can cope with; after introducing fresh filter areas the initial pressure drop across the filters returns once more to 250 to 500 psi.

A practical limit is set on the pressure drop at which the filters are renewed by, in particular, the shortest time period during which the more frequently occurring backflushing operation can be carried out and this depends mainly on the cooling of the plastic plugs utilized to control flow in the valves. In the above example a satisfactorily hard Polypropylene plug of 1 inch diameter will be formed in 10 to 12 minutes, utilizing cooling water at ambient temperature; these plugs can then be sufficiently softened to be removed in about 1.5 to 2 minutes. In general workable flat plugs can be constructed to respond in half these times but the thicknesses that can be used depend on the mechanical strength of the plastic being filtered and the pressure differential which must be supported.

Finally, while a filter body has been shown as one embodiment with two side-by-side filtering apparatus served by a manifold, the present invention contemplates the use of any number of filtering apertures arranged in any arrangement provided that they are in a parallel flow configuration.

The control of heating and cooling means and mechanical traction described above is preferably accomplished by electrical switchgear activated and controlled by a programmable computer. A flow chart showing steps involved in a suitable computer program is shown in FIGS. 18 and 19.

The operation of a filtering system according to the invention under computer control involves detecting the pressure drop across the filters, valve cooling and polymer plug forming in the valves, timing of a suitable period to facilitate plug forming, closing the valves either by cooling alone or by accompanying mechanical traction, heating the valve bodies in order to open them, moving the filters so as to introduce fresh filter parts and controlling the filter lengths so introduced, keeping track of which filtering chamber is to be operated next and which actuator (in the case of double-acting actuators, which side of any actuator) is to be powered next and in what sequence so that the backflushing and filter renewal operations are fully controlled and properly coordinated. Filter movement may be controlled using a servo system of known art (U.S. Pat. No. 3783355) or by actuating an automatic cutter at the emerging filter end and detecting the position of the cut end by means of a photoelectric cell: in this way the filtering operation can be fully automated. In a similar way the semi-solid or solid plastic plug carrying the contaminants emerging from the purge valve can be severed and the position of the cut end can be likewise detected; where the contaminants are carried out in a largely fluid stream timing the open period of the valve will suffice. During purging through valve 20 contaminants carried in Polypropylene the removal of as little as 215 grs. (less than half a pound) sufficed to adequately clean the filter area, depending somewhat on filter construction and the nature of the contaminants.

Figure 18:
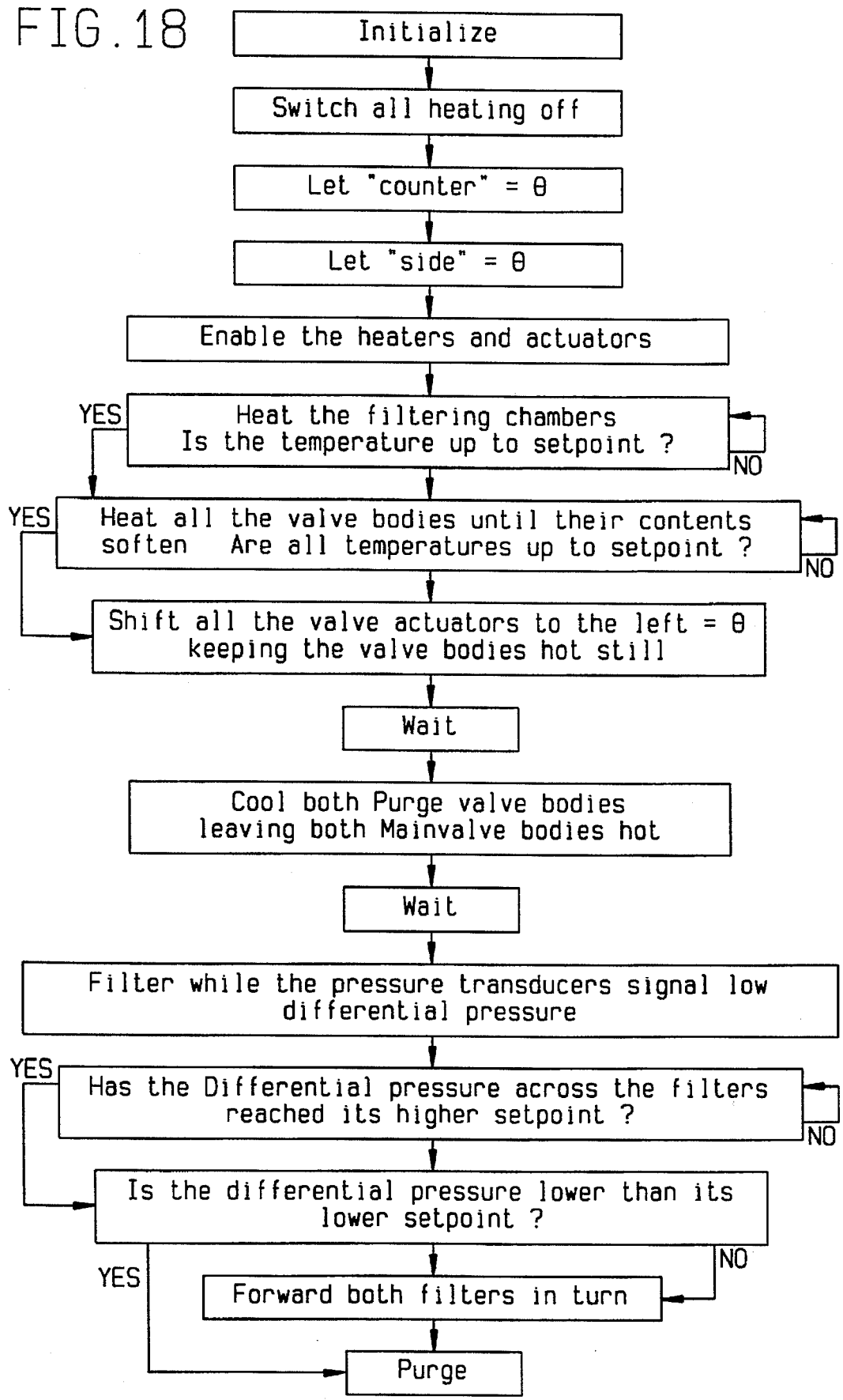
FIGS. 18 and 19 comprise a flow chart showing a series of program steps which correspond to successive computer operations.
Figure 19A:
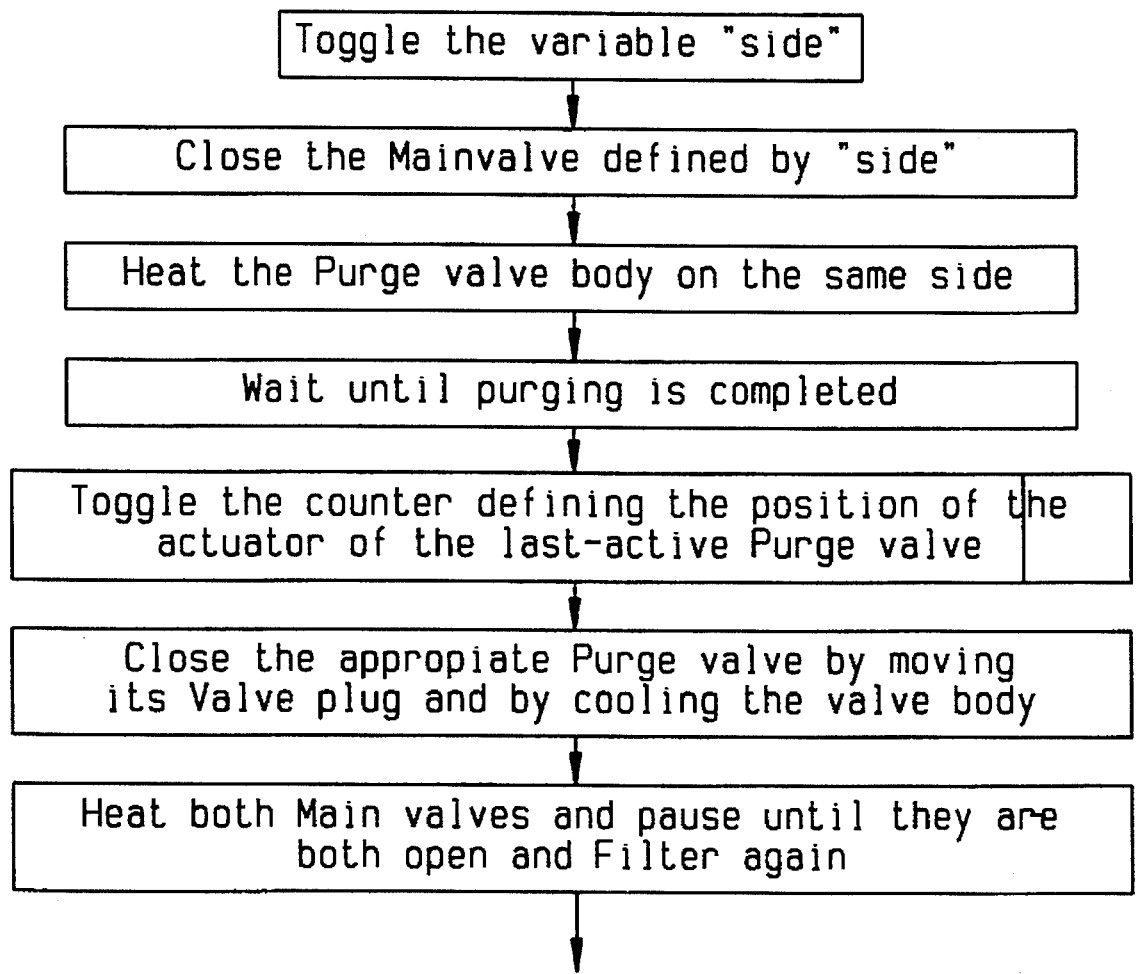
Figure 19B:
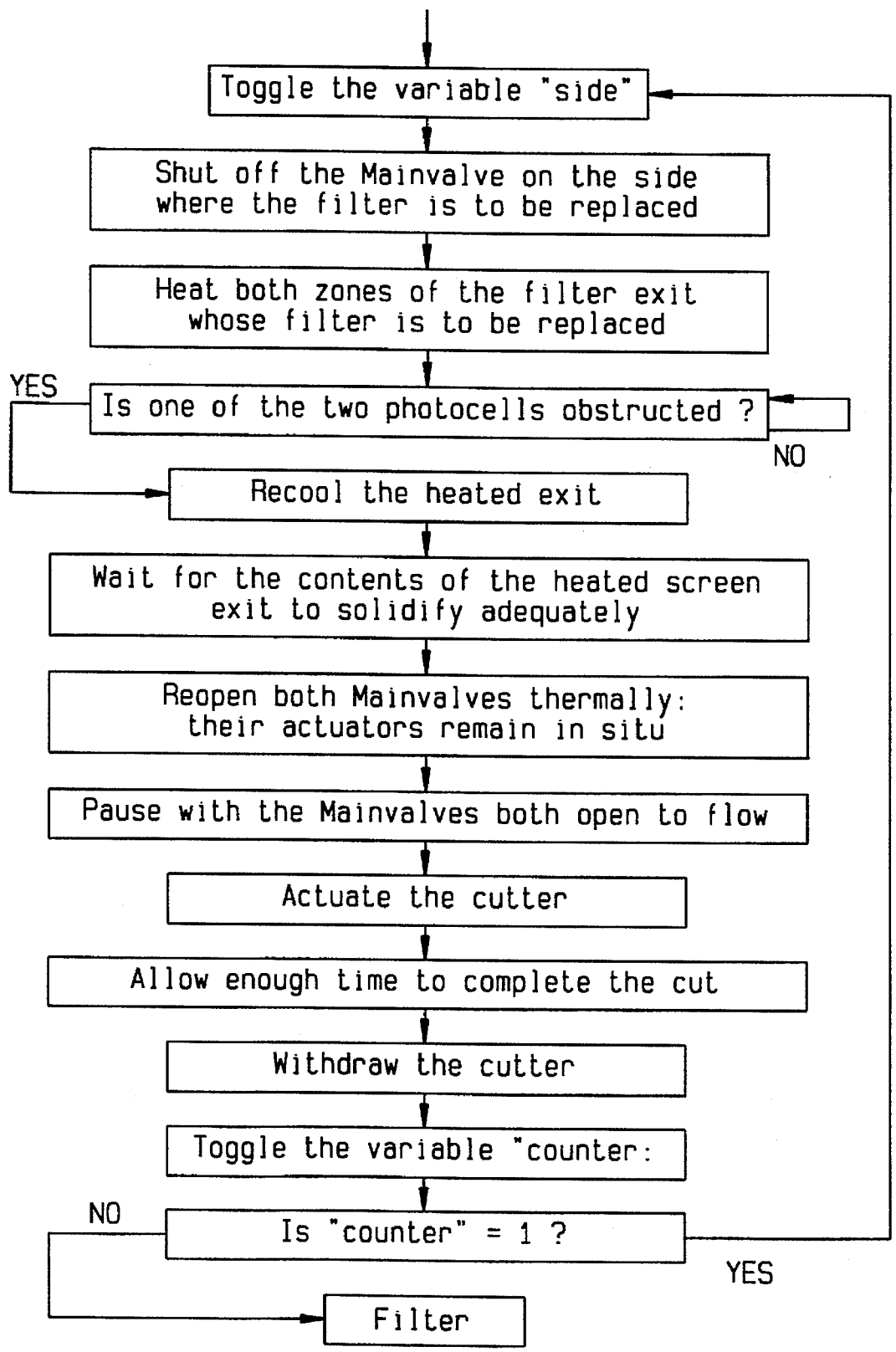

Turning to the flowcharts of FIGS. 18 and 19, the steps listed correspond to successive computer operations and are aimed at detecting the pressure drop across the filters, actuating the required heating, cooling and tractive steps according to a predetermined time schedule as well as severing the emerging polymer plugs and obtaining positional information of the cut ends. The term "initialize" refers to the establishment of known initial conditions in the apparatus and storing the data required for operating it. The term "side" refers to a selected filter and its associated valves, "counter" is an internal reminder keeping track of filter movement, "toggle" refers to changing the filter selected or the sense of actuator movement for the next operation. "Photocells" are devices detecting the position of the emerging polymer plugs and "cutters" are devices such as pneumatically reciprocated motorized circular saws which severe these plugs; the use of methods less prone to causing accidents such as detecting holes drilled in the plugs rather than severing the plugs are also anticipated.

I claim:

1. Apparatus for filtering fluid substances comprising a filter body, a filter carrying passage conduit in the filter body having an inlet communicable with a source of a fluid substance, an outlet, means for disposing a filter part in the filter carrying passage conduit between the inlet and outlet and a non-filter carrying conduit through which the substance may pass comprising a flow control means including at least one valve plug means for controlling flow of the substance in a conduit, each valve plug means in a conduit in turn comprising:

(a) a side passage extending laterally from and in flow communication with such conduit;

(b) cooling means for the side passage to form therein a valve plug of solidified substance which plug when moved into said conduit is capable of stopping flow therein; and (c) plug moving means for moving the valve plug from the side passage into such conduit so as to stop the flow of the substance therethrough.

2. The filtering apparatus of claim 1 having in addition second cooling means for cooling the conduit at the location where the conduit and side passage are in flow communication which second cooling means assists in maintaining the valve plug.

3. The filtering apparatus of claim 1 having in addition heating means at the location where the conduit and the side passage are in flow communication to assist in melting of the valve plug.

4. The filtering apparatus of claim 1 in which the cooling means is a water jacket with a spaced-apart water inlet and water outlet.

5. The filtering apparatus of claim 1 in which the side passage cooling means in turn comprises a plurality of cooling zones.

6. The filtering apparatus of claim 1 in which the plug moving means includes mechanical moving means.

7. The filtering apparatus of claim 1 in which the plug moving means includes a piston in the side passage.

8. The filtering apparatus of claim 7 in which the piston is moved by the pressure of the fluid substance being filtered.

9. The filtering apparatus of claim 7 in which the piston is moved using hydraulic means.

10. The filtering apparatus of claim 7 in which the piston includes a thermally conducting extension which projects into the substance being formed into a valve plug to assist in the cooling of the substance.

11. The filtering apparatus of claim 1 having at least one additional side passage which communicates with the conduit at a position to provide a valve plug to the conduit in addition to the valve plug provided by the first side passage.

12. The filtering apparatus of claim 11 having in addition a double acting actuator to alternatively move valve plugs from one or more of the side passages into the conduit.

13. The filtering apparatus of claim 12 in which the double actuator includes a master cylinder, a master piston and a slave piston in each side passage to move valve plugs therein, the side passages and slave pistons being axially aligned.

14. The filtering apparatus of claim 13 in which the slave pistons are moved by the master cylinder under pressure of the substance being filtered.

15. The filtering apparatus of claim 13 in which the master piston has two sides, and having a valve in the master cylinder and in which one or the other side of the master piston is exposed to pressure of the substance being filtered through such master cylinder valve.

16. The filtering apparatus of claim 1 having in addition a secondary outlet conduit in the body means for discharging substance with contaminants therein.

17. The filtering apparatus of claim 16 having a plug valve means in the secondary outlet conduit.

18. The filtering apparatus of claim 1 having at least one additional filter carrying passage conduit and in which each filter carrying passage conduit in the apparatus has an inlet communicable with a source of fluid substance and an outlet and the filter apparatus having in addition further flow control means including means for providing communication between the outlets of the filter carrying passage conduits.

19. The filtering apparatus of claim 18, in which the flow control means in addition comprises means for determining the pressure drop across a filter part in the respective passage during filtering, and means for operating the flow control means when the pressure drop in one of the passage exceeds a predetermined level so as to restrict flow of material into and through that passage conduit.

20. The filtering apparatus of claim 18, wherein each filter carrying passage conduit is provided with a secondary outlet conduit disposed between the substance inlet and the position of a filter part in use, valve means being provided for selectively opening and closing the secondary outlet conduit, such apparatus having an operating condition in which the flow control means prevents flow into the inlet of a passage conduit, the secondary outlet conduit of that passage conduit is open, and the material outlet of that passage conduit is in communication with the material outlet of another passage conduit, whereby pressure of the filtered substance from the other passage conduit causes a counterflow through the filter part and movement of substance including contaminants through the secondary outlet conduit.

21. The filtering apparatus of claim 20 having in addition flow control means for determining the pressure drop across a filter part during filtering, means for operating the flow control means when the pressure drop in one of the passage conduits exceeds a predetermined level so as to prevent flow of material through the inlet of the passage conduit and means for opening the secondary outlet conduit of the passage conduit when the pressure drop exceeds said level so as to permit said counterflow.

22. The filtering apparatus of claim 21 wherein the means for determining the pressure drop across a filter part is operative to detect a pressure drop after a counterflow operation, which if it exceeds a predetermined level causes a fresh filter part to be introduced into the passage.

23. The apparatus of claim 22 wherein the secondary outlet is closed during introduction of the fresh filter part.

24. The apparatus of claim 18 in which the flow control means includes a flow diverter having a diverter inlet for connection to a source of such substance, a first conduit connected to the inlet of a first passage conduit and to the diverter inlet and a second conduit connected to the inlet of a second passage conduit and the diverter inlet and wherein a conduit is provided with plug valve means.

25. The apparatus of claim 18 having in addition filter part moving means and a computer that processes data representing conditions in the apparatus so as to control said means for communicating between passage conduits, to control opening and closing valves including solidifying, melting and moving valve plugs and to control the moving filter parts.

26. The apparatus of claim 25 wherein the data representing conditions in the apparatus comprises data representing pressures, temperatures, times and positons including valve plug and filter part positions.

27. The filtering apparatus of claim 1 having a filter inlet port in the body means and a filter outlet port in the body means and means for moving said filter part through the inlet port, across the filter carrying passage conduit and finally through the outlet port.

28. The filtering apparatus of claim 27 having in addition a sealing plug in each inlet port and in each outlet port for each filter part to be passed through in sealed engagement.

29. The filtering apparatus of claim 28 having in addition port cooling means in the inlet and outlet ports for producing sealing plugs of such substance being filtered.

30. The filtering apparatus of claim 29, wherein the sealing plugs are moveable when desired in the direction of movement of a filter part, at least partly under the influence of the pressure of the substance coming from the outlet of another passage conduit.

31. The filtering apparatus of claim 30 wherein the cross sectional area of the filter outlet port of a passage is greater than that of the cross sectional area of the filter inlet port.

32. The filtering apparatus of claim 29 wherein the sealing plugs are movable when desired in the direction of movement of a filter part by mechanical traction.

33. The apparatus of claim 28 having in addition a computer that processes data representing conditions in the apparatus so as to control formation of sealing plugs, opening and closing valves including solidifying and melting valve plugs and moving filter parts.

34. The apparatus of claim 33 wherein the data representing conditions in the apparatus comprises data representing pressures, times, positions of flow control valve plug and filter part positions.

35. The filtering apparatus of claim 27 wherein the flow control means includes in addition means for determining when flow into the inlet of a passage conduit is restricted and a condition of reduced pressure drop across a filter part has been achieved and means for controlling the moving means to then cause movement of the filter part.

36. The filtering apparatus of claim 35 wherein the said moving means includes means for introducing a fresh portion of the filter part to replace substantially an entire contaminated filter part in the passage conduit.

37. Apparatus for filtering a flowable substance such as hot polymer comprising a body means having at least two filtering chambers therein, each of which has:

(a) an inlet for material to be filtered and an outlet for filtered material and a secondary outlet for removing collected contaminants;

(b) a filter, a filter inlet port for each of said filtering chambers and a filter outlet port from each of said chambers such that the filter can be passed into, through and out of each chamber;

(c) sealing means including sealing plugs formed in the inlet and outlet ports for sealing the filtering chamber against leakage where the filter enters and leaves the filtering chamber; and (d) means for introducing fresh filter medium into the filtering chamber through the filter inlet port and for removing used filter medium through the filter outlet port;

wherein the outlets for filtered substance of the filtering chambers communicate, the apparatus further including flow control means capable of permitting flow of such flowable substance from a source thereof into the inlet of the first filtering chamber, through a filter part situated therein and from the outlet thereof, while preventing such flow from said source into and through the second filtering chamber; and for alternatively permitting flow of such flowable substance from said source into the second filtering chamber, through a filter part situated therein and from the outlet thereof while preventing such flow from said source into and through the first filtering chamber, the said flow control means including at least one valve which has (a) a conduit through which the flow is controlled, (b) at least one side passage extending laterally from and in flow communication with said conduit;

(c) cooling means for each such side passage, capable of forming therein a valve plug of substantially solidified substance while flow of such substance is still permitted through the conduit in flow communication with one of said passages;

(d) plug moving means for moving the valve plug from a side passage into the conduit so as to stop the flow of such substance therethrough; and (e) heating means permitting the softening of said valve plug and its subsequent movement out of said conduit when the re-establishment of flow through the conduit is desired.

38. The apparatus of claim 37 having in addition a computer that processes data representing conditions in the apparatus so as to control hot polymer flow, to control opening and closing each plug valve including solidifying and melting valve plugs and to control moving filter parts.

39. The apparatus of claim 38 wherein the data representing conditions in the apparatus comprises data representing pressures, temperatures, times, positions of flow control valve plug and filter part positions.

40. A process for filtering a flowable substance using apparatus including at least one filter carrying passage conduit with an inlet and outlet where a filter part is disposed across the passage conduit between the inlet and outlet and such apparatus having at least one non-filter carrying conduit through which conduit such material flows comprising the step of providing flow control means for at least one of such conduits and having the additional steps of
   (a) providing a side passage extending laterally from and in flow communication with a conduit having such flow control means;
   (b) cooling each such side passage to form therein a valve plug of solidified substance which valve plug when moved into said conduit is capable of stopping flow therein; and
   (c) moving the valve plug from the side passage into said conduit to stop the flow of the material therethrough.

41. The filtering process of claim 40 having the additional steps of
   (a) providing second cooling means for cooling the conduit into which a valve plug is moved at the location where the conduit and side passage are in flow communication; and
   (b) operating such second cooling means to maintain the valve plug in the conduit.

42. The filtering process of claim 40 having the additional steps of
   (a) providing heating means at the location where the conduit and the side passage are in flow communication; and
   (b) operating such heating means to assist in dispersal of the valve plug.

43. The filtering process of claim 42 having the additional steps of
   (a) providing the cooling means with cooling zones; and
   (b) operating the cooling zones to cool the side passage.

44. The filtering process of claim 42 having the additional steps of
   (a) providing plug moving means which include mechanical moving means; and
   (b) operating such moving means to move the valve plug.

45. The filtering process of claim 42 having the additional steps of
   (a) providing a piston in the side passage; and
   (b) operating the piston to move the valve plug.

46. The filtering process of claim 45 having the additional steps of
   (a) causing pressure of the substance being filtered to be applied to such piston to move the piston; and
   (b) moving the valve plug along the side passage by force of the piston.

47. The filtering process of claim 45 having the additional steps of
   (a) providing hydraulic means to move the piston; and
   (b) operating the hydraulic means to move the piston so as to urge the valve plug into the conduit.

48. The filtering process of claim 45 having the additional steps of
   (a) providing a thermally conducting extension on the piston;
   (b) assisting in valve plug solidification employing such extension.

49. The filtering process of claim 40 having the additional steps of
   (a) providing cooling means comprising a water jacket with spaced-apart water inlet and outlet; and
   (b) operating the water jacket to cool the side passage.

50. The filtering process of claim 40 having the additional steps of
   (a) providing at least one additional side passage communicating with the conduit adjacent the first side passage; and
   (b) causing the valve plugs to be formed in such additional side passages.

51. The filtering process of claim 40 having the additional steps of
   (a) providing a double acting actuator; and
   (b) operating such actuator to alternatively move the valve plugs from one or more of the side passages into the conduit.

52. The filtering process of claim 51 having the additional steps of
   (a) providing the double acting actuator with a master cylinder, a master piston and a slave piston in each side passage, the slave pistons being axially aligned; and
   (b) moving the valve plugs out of such side passages employing such slave piston.

53. The filtering process of claim 52 having the additional step of providing means for causing the master piston to be moved by substance being filtered.

54. The filtering apparatus of claim 52 having the additional steps of
   (a) providing the master piston with two sides and providing a valve in the master cylinder; and
   (b) exposing one side or the other side of the master piston to the pressure of the substance being filtered through such valve to move the master piston.

55. The filtering process of claim 40 having the additional steps of
   (a) providing a secondary outlet conduit in the body means; and
   (b) discharging flowable material with contaminants through the outlet conduit.

56. The filtering process of claim 55 having the additional step of providing plug valve means in the secondary outlet conduit.

57. The filtering process of claim 40 having the additional steps of
   (a) providing at least one additional filter carrying passage conduit;
   (b) providing for each such passage conduit an inlet communicable with a source of flowable substance and an outlet;
   (c) further providing means for communicating the outlets of the passage conduits to enable counterflow; and
   (d) causing the material filtered in one passage conduit to communicate with the material filtered in another passage conduit.

58. The filtering process of claim 57 having the additional steps of
   (a) providing flow control means including a flow diverter having a diverter inlet for connection to a source of such substance;

(b) providing a first conduit connected to the inlet of a first passage conduit and to the diverter inlet;

(c) providing a second conduit connected to the inlet of the second passage conduit and the diverter inlet;

(d) providing plug valve means in each conduit; and (e) diverting substance flow from the first passage to the second passage.

59. The filtering process of claim 40 having the additional steps of (a) providing a filter part and a filter inlet port and a filter outlet port in the body means;

(b) providing means for moving the filter part; and (c) passing a filter part through the inlet port across the filter carrying passage conduit and out through the outlet port.

60. The filtering process of claim 59 having in addition the steps of (a) providing sealing plugs in the inlet and outlet ports; and (b) moving the filter part through such inlet and outlet ports in sealed engagement.

61. The filtering process of claim 60 having in addition the steps of (a) providing flow control means and further providing means for determining the pressure drop across the filter parts during filtering and providing valve means to restrict flow through a passage conduit; and (b) restricting flow of material into and through a passage conduit when the pressure drop exceeds a predetermined amount.

62. The filtering process of claim 60 having in addition the steps of (a) providing cooling means adjacent the inlet and outlet ports; and (b) cooling material in the inlet and outlet ports to form sealing plugs.

63. The filtering process of claim 60 having in addition the steps of (a) providing data representing parameters of the filtering process to a computer for processing;

(b) processing the data by the computer so as to cause, under computer control, in selected sequence valves to open and close, filters to move and valve plugs to solidify and to melt.

64. The filtering process of claim 63 wherein the data representing parameters of the filtering process comprises the data representing pressures, temperatures, times, positions of flow control valve plug and filter part positions.

65. The filtering process of claim 59 having in addition the steps of (a) providing flow control means with further control means to determine when flow into the inlet of a passage conduit is restricted and when a condition of a reduced pressure drop across a filter part has been achieved; and (b) causing movement of the filter part in accordance with such determinations.

66. The filtering process of claim 65 having in addition the steps of (a) providing control means including moving means for introducing a fresh portion of the filter part; and (b) moving such filter part to replace substantially an entire contaminated filter part in the passage conduit.

67. The filtering process of claim 65 having in addition the steps of causing sealing plugs to move in the direction of movement of a filter part at least partly under the influence of the pressure of the substance from the outlet of another passage conduit.

68. The filtering process of claim 67 having the additional step of providing a cross-sectional area of the filter outlet port which is greater than the cross-sectional area of the filter inlet port.

69. The filtering process of claim 65 having in addition the steps of causing the sealing plugs to move in the direction of movement of the filter part by mechanical traction.

70. The filter process of claim 59 having the additional steps of (a) providing a secondary conduit disposed between the substance inlet and the position of the filter part in use;

(b) providing valve means for selectively opening and closing such secondary outlet conduit;

(c) preventing flow into the inlet of a passage conduit;

(d) opening the secondary outlet conduit of such passage conduit; and (e) causing the material outlet of such passage conduit to be in communication with the material outlet of another passage conduit to cause movement of contaminated substance out of the secondary outlet conduit.

71. The filtering process of claim 70 having the additional steps of (a) providing means for determining the pressure drop across a filter part after such counterflow; and (b) causing a fresh filter part to be introduced in the passage conduit if counterflow has not sufficiently cleaned the active filter part.

72. The filtering process of claim 71 having in addition the step of closing the secondary outlet conduit during introduction of the fresh filter part.

73. The filtering process of claim 59 having in addition the steps of (a) providing means for determining the pressure drop across a filter part during filtering;

(b) providing means for operating the flow control means when the pressure drop in one of the passage conduits exceeds a predetermined level;

(c) providing means for opening the secondary outlet conduit;

(d) operating such means for operating the flow control means to prevent flow of material through the inlet of the passage conduit; and (e) opening the secondary outlet conduit when such pressure drop exceeds such level to discharge contaminated substance by means of counterflow.

74. The filtering process of claim 59 having in addition the steps of (a) providing data representing parameters of the filtering process to a computer for processing;

(b) processing the data by the computer so as to cause, under computer control, valves to open and close in a selected sequence, filters to move and valve plugs to solidify and to soften or melt.

75. The filtering process of claim 74 wherein the data representing parameters of the filtering process comprises the data representing pressures, temperatures, times, positions of flow control valve plug and filter part positions.

76. The filtering process of claim 40 in which the substance filtered is a hot polymer.

77. A process for filtering a flowable substance in apparatus having a filter body containing at least two filtering chambers provided with filters, each filtering chamber being provided with (a) an inlet for introducing material to be filtered and an outlet for filtered material to exit from, (b) an inlet port and an outlet port for the filter to be passed into, through and out of said filtering chamber, (c) filter sealing means including sealing plugs formed in the inlet and outlet ports sealing the filter against leakage as it passes through the inlet and outlet ports; and (d) means for selectively introducing a fresh filter part into one or another filtering chamber through its inlet port and for removing a used filter part through its outlet port;

the outlets for filtered material of the filtering chambers communicating;

the process including steps of selectively permitting flow of a flowable substance from a source thereof into and through a second filtering chamber whilst stopping flow in the first filtering chamber, thus creating a condition of substantially zero pressure drop across a filter part in the first filtering chamber, and introducing a fresh filter part into the first filtering chamber and removing a used filter part therefrom; and alternatively selectively permitting flow of such material from a source thereof into and through the first filtering chamber whilst stopping flow in a second filtering chamber, thus creating a condition of substantially zero pressure drop across a filter part in the second filtering chamber and introducing a fresh filter part into the second filtering chamber and removing a used filter part from the second filtering chamber whilst flow in its is so prevented, wherein the step of preventing such flow in such a filtering chamber includes the further steps of (a) providing at least one side passage extending laterally from and in flow communication with the inlet conduit of each filtering chamber;

(b) cooling at least one side passage to form therein a valve plug of substantially solidified substance whilst flow of such substance is still permitted through the inlet conduit of the filtering chamber in flow communication with said side passage, and (c) urging the substantially solidified valve plug from such a side passage into the associated inlet conduit so as to prevent flow of such substance in the inlet conduit, and (d) removing said valve plug from the inlet conduit when flow within that conduit is to be re-established.

78. The filtering process of claim 77 having in addition the steps of (a) providing data representing parameters of the filtering process to a computer for processing;

(b) processing the data by the computer so as to cause, under computer control, valves to open and close in a selected sequence, filters to move and valve plugs to solidify and to soften or melt.

79. The filtering process of claim 78 wherein the data representing parameters of the filtering process comprises the data representing pressures, temperatures, times, positions of flow control valve plug and filter part positions.

80. A process of filtering a flowable substance in apparatus comprising at least two filtering chambers provided with filters, each of which has (a) an inlet conduit for substance to be filtered and an outlet for filtered substance;

(b) an inlet port and an outlet port for a filter which passes through the filtering chamber;

(c) sealing means including sealing plugs for the filter inlet and outlet ports;

(d) means for selectively introducing a fresh filter part into one or another filtering chamber through its inlet port and for removing a used filter part through its outlet port; and (e) a secondary outlet for each filtering chamber positioned between the inlet conduit of the filtering chamber and the filter part in use within the filtering chamber, the secondary outlet being selectively controllable so as to either prevent or permit removal of the flowable substance from the filtering chamber;

the process including the steps of selectively permitting flow of such substance from a source thereof into the inlet conduit of a second filtering chamber; exposing the second filtering chamber to the pressure of substance exiting from the first filtering chamber and permitting flow of substance through the secondary outlet of the second filtering chamber so as to create a counterflow of substance through a filter part situated within the second filtering chamber; and likewise selectively permitting flow of such substance from a source thereof into the inlet conduit of the second filtering chamber whilst preventing such flow into the inlet conduit of the first filtering chamber; exposing the first filtering chamber to the pressure of substance exiting from the second filtering chamber and permitting flow of substance through the secondary outlet of the first filtering chamber so as to create a counterflow of substance through a filter part situated within the first filtering chamber; each secondary outlet being provided with a valve which has (a) a conduit through which flow is controlled;

(b) at least one side passage extending laterally from and in flow communication with said conduit;

(c) cooling means for each side passage, operable to form therein a valve plug of substantially solidified substance, and (d) means for urging the valve plug from the side passage into the conduit so as to stop the flow of substance therethrough, and (e) heating means for re-softening and removal of the valve plug when reopening of the conduit is required.

81. The filtering process of claim 80 having in addition the steps of (a) providing data representing parameters of the filtering process to a computer for processing;

(b) processing the data by the computer so as to cause, under computer control, valves to open and close in a selected sequence, filters to move and valve plugs to solidify and to soften or melt.

82. The filtering process of claim 81 wherein the data representing parameters of the filtering process comprises the data representing pressures, temperatures, times, positions of flow control valve plug and filter part positions.

83. A process for filtering a substantially fluid substance using apparatus including a filter body containing at least two filtering chambers provided with filters and providing each filtering chamber with (a) an inlet conduit for substance to be filtered and an outlet for filtered substance;

(b) an inlet port and an exit port through which a filter is passed into, through and out of the filtering chamber, (c) means for selectively introducing a fresh filter part into the filtering chamber through its inlet port and for removing a used filter part through its outlet port; and (d) cooling means for forming seals in the filter inlet and outlet ports in the form of plugs of the substance being filtered or of another substance, the plugs being movable during the movement of the filter;

the process including the steps of selectively permitting flow of substance from a source thereof into the inlet conduit of a first filtering chamber, through a filter part therein and from the outlet thereof, whilst preventing such flow into and through a second filtering chamber, exposing the second filtering chamber to the pressure of substance exiting from the first filtering chamber and using such pressure to effect or assist movement of a filter in the second filtering chamber by the movement of a sealing plug, situated in the outlet port, in the direction of filter advance; and likewise selectively permitting flow of substance from a source thereof into the inlet conduit of the second filtering chamber, through a filter part therein and from the outlet thereof, whilst preventing such flow into and through the first filtering chamber, exposing the first filtering chamber to the pressure of substance exiting from the second filtering chamber and using such pressure to effect or assist movement of a filter in the first filtering chamber by moving the sealing plug in which it is embedded in the direction of filter advance; wherein the step of preventing such flow in such a filtering chamber includes the further steps of (a) providing at least one side passage extending laterally from and in flow communication with the inlet conduit of the filtering chamber in which flow is to be stopped, (b) cooling said side passage so as to form in it a valve plug of substantially solidified substance whilst the flow of such substance is still permitted through the communicating inlet conduit of the filtering chamber; and (c) urging the substantially solidified valve plug from the side passage in which it was formed into the inlet conduit of the filtering chamber through which flow is to be stopped, and (d) re-heating said valve plug when its removal is required so that flow through said filtering chamber can be re-established.

84. The filtering process of claim 83 having in addition the steps of (a) providing data representing parameters of the filtering process to a computer for processing;

(b) processing the data by the computer so as to cause, under computer control, valves to open and close in a selected sequence, filters to move and valve plugs to solidify and to soften or melt.

85. The filtering process of claim 84 wherein the data representing parameters of the filtering process comprises the data representing pressures, temperatures, times, positions of flow control valve plug and filter part positions.

86. A process for filtering a flowable substance in filtering apparatus provided with at least two filtering chambers provided with filters, each of which has (a) an inlet conduit for substance to be filtered and an outlet for filtered substance;

(b) a perforated filter support for supporting a filter part disposed across the filtering chamber and situated between its filter inlet port and outlet port;

(c) a secondary outlet situated between the substance inlet of said filtering chamber and the filter part therein; and (d) thermal and mechanical control means for selectively permitting or preventing flow of substance through the secondary outlet by the controlled formation and movement of a valve plug of the substantially solidified substance;

the process including the steps of selectively permitting flow of such material from a source thereof into the inlet of a first filtering chamber whilst flow into a second filtering chamber is stopped by means of a valve plug, so as to filter the substance in the first filtering chamber; subsequently terminating flow into the inlet of the first filtering chamber by means of a valve plug whilst permitting flow into the second filtering chamber where filtering is then carried out, in each case carrying out a counterflow operation in the filtering chamber whose inlet is obstructed by means of a valve plug, the counterflow operation comprising the steps of:

exposing the filtering passage within which counterflow is to take place to the pressure of substance already filtered in another filtering chamber, through which at that time filtering is taking place; using thermal control means to soften the valve plug blocking the secondary outlet of the filtering chamber in which counterflow is to take place, so as to permit this plug to move out of the apparatus and allow counterflow through the filter part in the communicating filtering chamber so as to flush contaminants therefrom, and thereafter once more stopping flow in the secondary outlet through which counterflow took place by means of a fresh valve plug thermally formed in a side passage in flow communication with the said secondary outlet and urged into the said secondary outlet so as to once more stop counterflow.

87. The filtering process of claim 86 having in addition the steps of (a) providing data representing parameters of the filtering process to a computer for processing;

(b) processing the data by the computer so as to cause, under computer control, valves to open and close in a selected sequence, filters to move and valve plugs to solidify and to soften or melt.

88. The filtering process of claim 87 wherein the data representing parameters of the filtering process comprises the data representing pressures, temperatures, times, positions of flow control valve plug and filter part positions.

* * * * *